US011711716B2

(12) United States Patent
Liu et al.

(10) Patent No.: US 11,711,716 B2
(45) Date of Patent: Jul. 25, 2023

(54) TECHNIQUES FOR IMPROVING REFLECTIVE QUALITY OF SERVICE

(71) Applicant: QUALCOMM Incorporated, San Diego, CA (US)

(72) Inventors: Feilu Liu, San Diego, CA (US); Suli Zhao, San Diego, CA (US); Alok Mitra, San Diego, CA (US); Srinivas Reddy Mudireddy, San Diego, CA (US); Reza Shahidi, San Diego, CA (US); Sitaramanjaneyulu Kanamarlapudi, San Diego, CA (US); Vaibhav Kumar, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/233,364

(22) Filed: Apr. 16, 2021

(65) Prior Publication Data

US 2022/0338050 A1 Oct. 20, 2022

(51) Int. Cl.
*H04W 28/02* (2009.01)
*H04W 36/00* (2009.01)
*H04L 47/2483* (2022.01)
*H04L 47/2408* (2022.01)
*H04L 47/2475* (2022.01)

(52) U.S. Cl.
CPC ..... *H04W 28/0215* (2013.01); *H04L 47/2408* (2013.01); *H04L 47/2475* (2013.01); *H04L 47/2483* (2013.01); *H04W 28/0268* (2013.01); *H04W 36/0033* (2013.01)

(58) Field of Classification Search
CPC . H04L 47/24; H04L 47/2408; H04L 47/2416; H04L 47/2475; H04L 47/2483; H04L 47/2491; H04W 28/0215; H04W 28/0268; H04W 36/0033; H04W 36/0044
See application file for complete search history.

(56) References Cited

U.S. PATENT DOCUMENTS

| | | | |
|---|---|---|---|
| 2019/0387428 A1* | 12/2019 | Ahmad | H04L 69/08 |
| 2020/0275302 A1* | 8/2020 | Youn | H04W 28/0268 |
| 2022/0053362 A1* | 2/2022 | Sebire | H04L 47/805 |
| 2022/0141705 A1* | 5/2022 | Venkataraman | H04W 28/0268 370/235 |
| 2022/0368782 A1* | 11/2022 | Ma | H04W 80/04 |

* cited by examiner

*Primary Examiner* — Pao Sinkantarakorn
(74) *Attorney, Agent, or Firm* — Patterson & Sheridan, L.L.P.

(57) ABSTRACT

Certain aspects of the present disclosure provide techniques for implementing reflective quality of service (RQoS) in wireless communication systems. A method for implementing RQoS that may be performed by a user equipment (UE) generally includes receiving a plurality of downlink user data packets from a first base station (BS), determining at least one reflective quality of service (RQoS) mapping rule for one or more uplink packet transmissions based on a subset of the plurality of downlink user data packets, filtering the plurality of downlink user data packets based on the at least one RQoS mapping rule, and forwarding the plurality of downlink user data packets to a corresponding application entity of the UE based on the filtering.

26 Claims, 15 Drawing Sheets

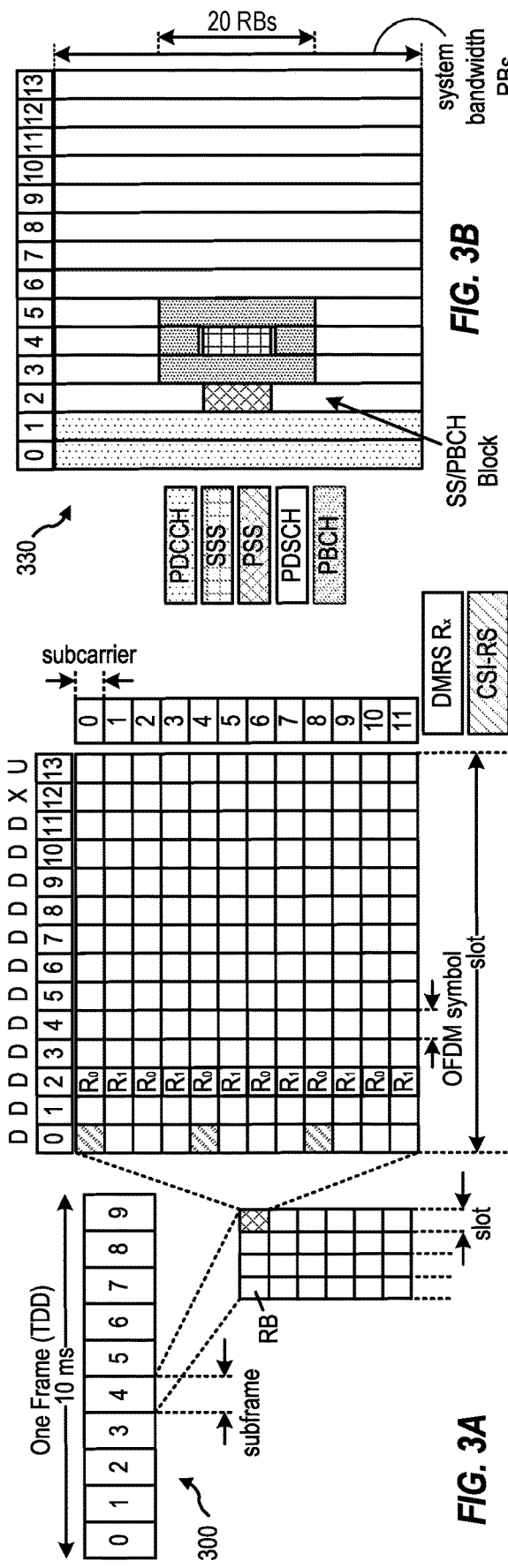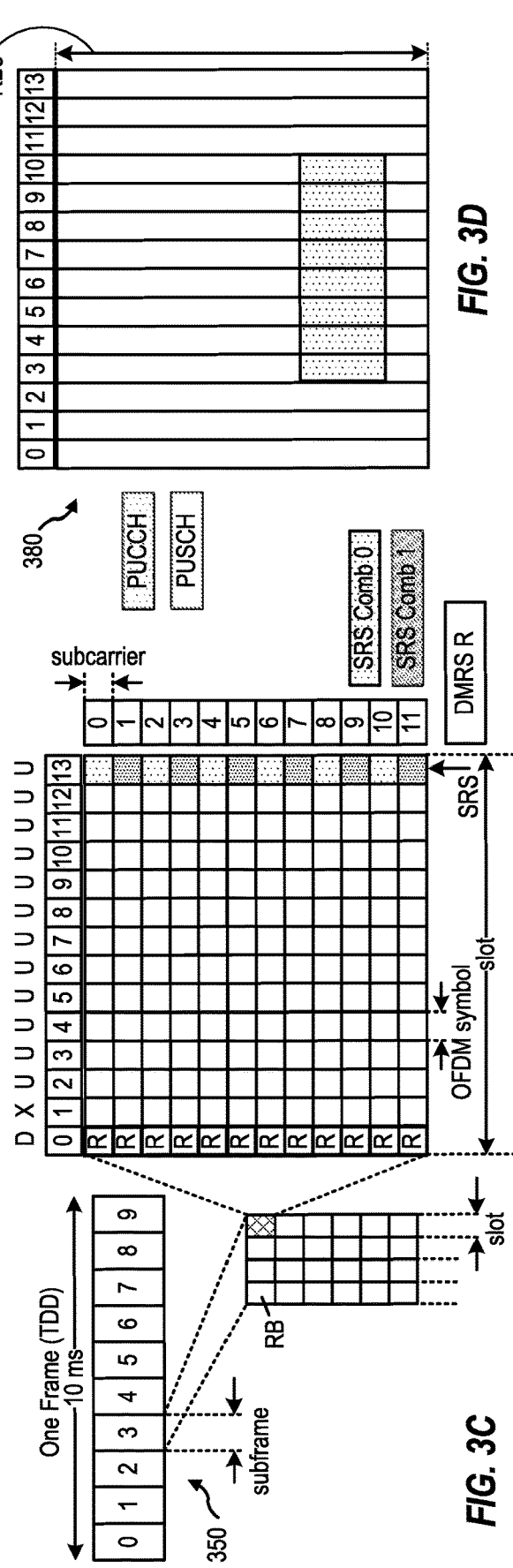

TECHNIQUES FOR IMPROVING REFLECTIVE QUALITY OF SERVICE

INTRODUCTION

Aspects of the present disclosure relate to wireless communications, and more particularly, to techniques for improving reflective quality of service (RQoS) implementation in wireless communication networks.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the subject matter described in this disclosure can be implemented in a method for wireless communication by a user equipment (UE). The method generally includes receiving a plurality of downlink user data packets from a first base station (BS); determining at least one reflective quality of service (RQoS) mapping rule for one or more uplink packet transmissions based on a subset of the plurality of downlink user data packets; filtering the plurality of downlink user data packets based on the at least one RQoS mapping rule; and forwarding the plurality of downlink user data packets to a corresponding application entity of the UE based on the filtering.

Certain aspects of the subject matter described in this disclosure can be implemented in a processing system for wireless communication by a user equipment (UE). The processing system may include a memory comprising computer-executable instructions; and one or more processors configured to execute the computer-executable instructions and cause the processing system to: receive a plurality of downlink user data packets from a first base station (BS); determine at least one reflective quality of service (RQoS) mapping rule for one or more uplink packet transmissions based on a subset of the plurality of downlink user data packets; filter the plurality of downlink user data packets based on the at least one RQoS mapping rule; and forward the plurality of downlink user data packets to a corresponding application entity of the UE based on the filtering.

Certain aspects of the subject matter described in this disclosure can be implemented in a processing system for wireless communication by a user equipment (UE). The processing system may include means for receiving a plurality of downlink user data packets from a first base station (BS); means for determining at least one reflective quality of service (RQoS) mapping rule for one or more uplink packet transmissions based on a subset of the plurality of downlink user data packets; means for filtering the plurality of downlink user data packets based on the at least one RQoS mapping rule; and means for forwarding the plurality of downlink user data packets to a corresponding application entity of the UE based on the filtering.

Certain aspects of the subject matter described in this disclosure can be implemented in a non-transitory computer-readable medium for wireless communication by a user equipment (UE). The non-transitory computer-readable medium may include computer-executable instructions that, when executed by one or more processors of a processing system, cause the processing system to: receive a plurality of downlink user data packets from a first base station (BS); determine at least one reflective quality of service (RQoS) mapping rule for one or more uplink packet transmissions based on a subset of the plurality of downlink user data packets; filter the plurality of downlink user data packets based on the at least one RQoS mapping rule; and forward the plurality of downlink user data packets to a corresponding application entity of the UE based on the filtering.

Certain aspects of the subject matter described in this disclosure can be implemented in a method for wireless communication by a user equipment (UE). The method generally includes determining to establish a protocol data unit (PDU) session with a first base station; determining, based on a type of the PDU session determined to be established, whether to transmit information to the first base station indicating that the UE supports reflective quality of service (RQoS); and taking one or more actions based on the determination of whether to transmit the information indicating that the UE supports RQoS.

Certain aspects of the subject matter described in this disclosure can be implemented in a processing system for wireless communication by a user equipment (UE). The processing system may include a memory comprising computer-executable instructions; and one or more processors configured to execute the computer-executable instructions and cause the processing system to: determine to establish a protocol data unit (PDU) session with a first base station; determine, based on a type of the PDU session determined to be established, whether to transmit information to the first base station indicating that the UE supports reflective quality of service (RQoS); and take one or more actions based on the determination of whether to transmit the information indicating that the UE supports RQoS.

Certain aspects of the subject matter described in this disclosure can be implemented in a processing system for wireless communication by a user equipment (UE). The processing system may include means for determining to establish a protocol data unit (PDU) session with a first base station; means for determining, based on a type of the PDU session determined to be established, whether to transmit information to the first base station indicating that the UE supports reflective quality of service (RQoS); and means for taking one or more actions based on the determination of whether to transmit the information indicating that the UE supports RQoS.

Certain aspects of the subject matter described in this disclosure can be implemented in a non-transitory computer-readable medium for wireless communication by a user equipment (UE). The non-transitory computer-readable medium may include computer-executable instructions that, when executed by one or more processors of a processing system, cause the processing system to: determine to establish a protocol data unit (PDU) session with a first base station; determine, based on a type of the PDU session determined to be established, whether to transmit information to the first base station indicating that the UE supports reflective quality of service (RQoS); and take one or more actions based on the determination of whether to transmit the information indicating that the UE supports RQoS.

Certain aspects of the subject matter described in this disclosure can be implemented in a method for wireless communication by a user equipment (UE). The method generally includes determining a first quality of service flow identifier (QFI) to data radio bearer (DRB) mapping rule for transmission of a plurality of downlink user data packets, wherein the first QFI-to-DRB mapping rule maps a first QFI to a first DRB; determining, while transmitting the plurality of downlink user data packets, a second QFI-to-DRB rule mapping that maps the first QFI to a second DRB different from the first DRB; detecting that an out-of-order delivery mode, associated with the plurality of downlink user data packets, is configured in lower layers of the UE for at least one of the first DRB or the second DRB; and refraining from transmitting an end-marker packet associated with the first DRB based on detecting the out-of-order delivery mode and determining the second QFI-to-DRB mapping rule.

Certain aspects of the subject matter described in this disclosure can be implemented in a processing system for wireless communication by a user equipment (UE). The processing system may include a memory comprising computer-executable instructions; and one or more processors configured to execute the computer-executable instructions and cause the processing system to: determine a first quality of service flow identifier (QFI) to data radio bearer (DRB) mapping rule for transmission of a plurality of downlink user data packets, wherein the first QFI-to-DRB mapping rule maps a first QFI to a first DRB; determine, while transmitting the plurality of downlink user data packets, a second QFI-to-DRB rule mapping that maps the first QFI to a second DRB different from the first DRB; detect that an out-of-order delivery mode, associated with the plurality of downlink user data packets, is configured in lower layers of the UE for at least one of the first DRB or the second DRB; and refrain from transmitting an end-marker packet associated with the first DRB based on detecting the out-of-order delivery mode and determining the second QFI-to-DRB mapping rule.

Certain aspects of the subject matter described in this disclosure can be implemented in a processing system for wireless communication by a user equipment (UE). The processing system may include means for determining a first quality of service flow identifier (QFI) to data radio bearer (DRB) mapping rule for transmission of a plurality of downlink user data packets, wherein the first QFI-to-DRB mapping rule maps a first QFI to a first DRB; means for determining, while transmitting the plurality of downlink user data packets, a second QFI-to-DRB rule mapping that maps the first QFI to a second DRB different from the first DRB; means for detecting that an out-of-order delivery mode, associated with the plurality of downlink user data packets, is configured in lower layers of the UE for at least one of the first DRB or the second DRB; and means for refraining from transmitting an end-marker packet associated with the first DRB based on detecting the out-of-order delivery mode and determining the second QFI-to-DRB mapping rule.

Certain aspects of the subject matter described in this disclosure can be implemented in a non-transitory computer-readable medium for wireless communication by a user equipment (UE). The non-transitory computer-readable medium may include computer-executable instructions that, when executed by one or more processors of a processing system, cause the processing system to: determine a first quality of service flow identifier (QFI) to data radio bearer (DRB) mapping rule for transmission of a plurality of downlink user data packets, wherein the first QFI-to-DRB mapping rule maps a first QFI to a first DRB; determine, while transmitting the plurality of downlink user data packets, a second QFI-to-DRB rule mapping that maps the first QFI to a second DRB different from the first DRB; detect that an out-of-order delivery mode, associated with the plurality of downlink user data packets, is configured in lower layers of the UE for at least one of the first DRB or the second DRB; and refrain from transmitting an end-marker packet associated with the first DRB based on detecting the out-of-order delivery mode and determining the second QFI-to-DRB mapping rule.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for improving reflective quality of service (RQoS) implementation in wireless communication networks. When RQoS is implemented, a UE may apply one or more RQoS mapping rules associated downlink user data packets received by the UE to uplink user data packets transmitted by the UE. In some cases, these RQoS mapping rules may include a RQoS mapping rule that maps a packet filter to a QoS flow identifier (QFI). Additionally, in some cases, these RQoS mapping rules may include a RQoS mapping rule that maps a QFI to a data radio bearer (DRB).

Implementing RQoS may require the UE to inspect all downlink user data packet received by the UE to determine whether an RQoS mapping rule already exists for these received downlink user data packets. However, having to inspect all downlink user data packets may result in the UE having to perform a high number of computations, resulting in higher power consumption at the UE, a reduction of battery run-time as well as, in some cases, the UE overheating.

Thus, aspects of the present disclosure provide techniques to help reduce the number of computations associated with implementing RQoS. For example, in some cases, such techniques may include deriving RQoS mapping rules based only on a subset of the downlink user data packets received by the UE, allowing the UE to only inspect the subset of the downlink user data packets instead of inspecting all downlink user data packets. By only having to inspect the subset of downlink user data packets, the number of computations performed by the UE associated with determining the RQoS mapping rules may be reduced, thereby reducing power consumption and increasing a batter run-time of the UE.

Figure 1:
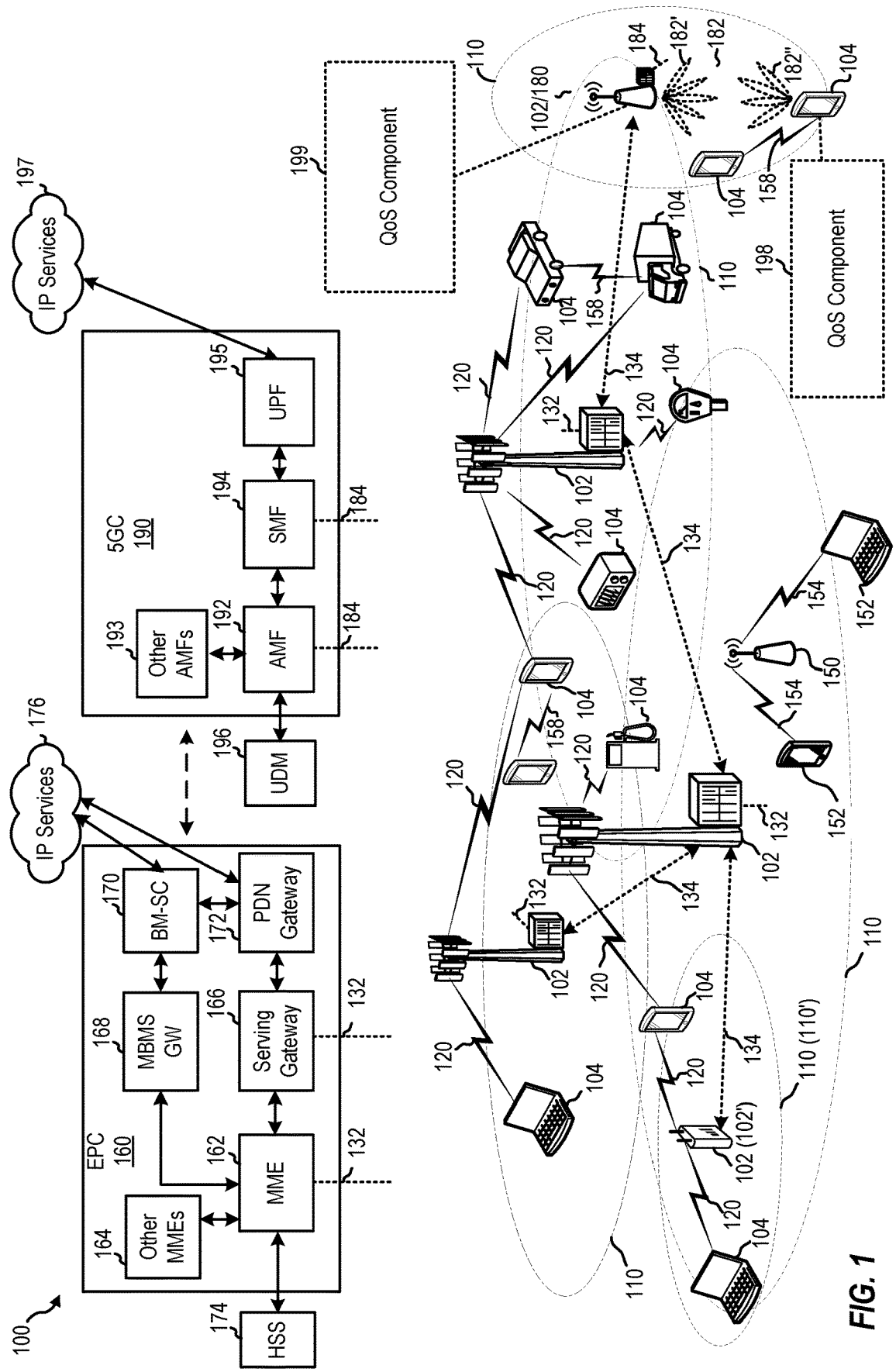
FIG. 1 is a block diagram conceptually illustrating an example wireless communication network.

Additionally, aspects of the present disclosure provide techniques for improving RQoS implantation that involve indicating whether or not the UE supports RQoS based on a service type of a protocol data unit (PDU) session associated with the UE. Further, aspects of the present disclosure also provide techniques for handling RQoS implementation in the presence of a handover from a fourth generation (4G) long term evolution (LTE) base station (BS) to a fifth generation (5G) new radio (NR) base station. Additionally, aspects of the present disclosure provide techniques for improving QoS re-mapping when a QFI that is mapped to a first DRB is re-mapped to a second DRB. Additionally, aspects of the present disclosure provide techniques for Introduction to Wireless Communication Networks FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes QoS component 199, which may be configured to perform the operations of one or more of FIGS. 6, 7, 9, 10, and/or 12. Wireless communication network 100 further includes QoS component 198, which may be used configured to perform the operations of one or more of FIGS. 6-14.

Figure 2:
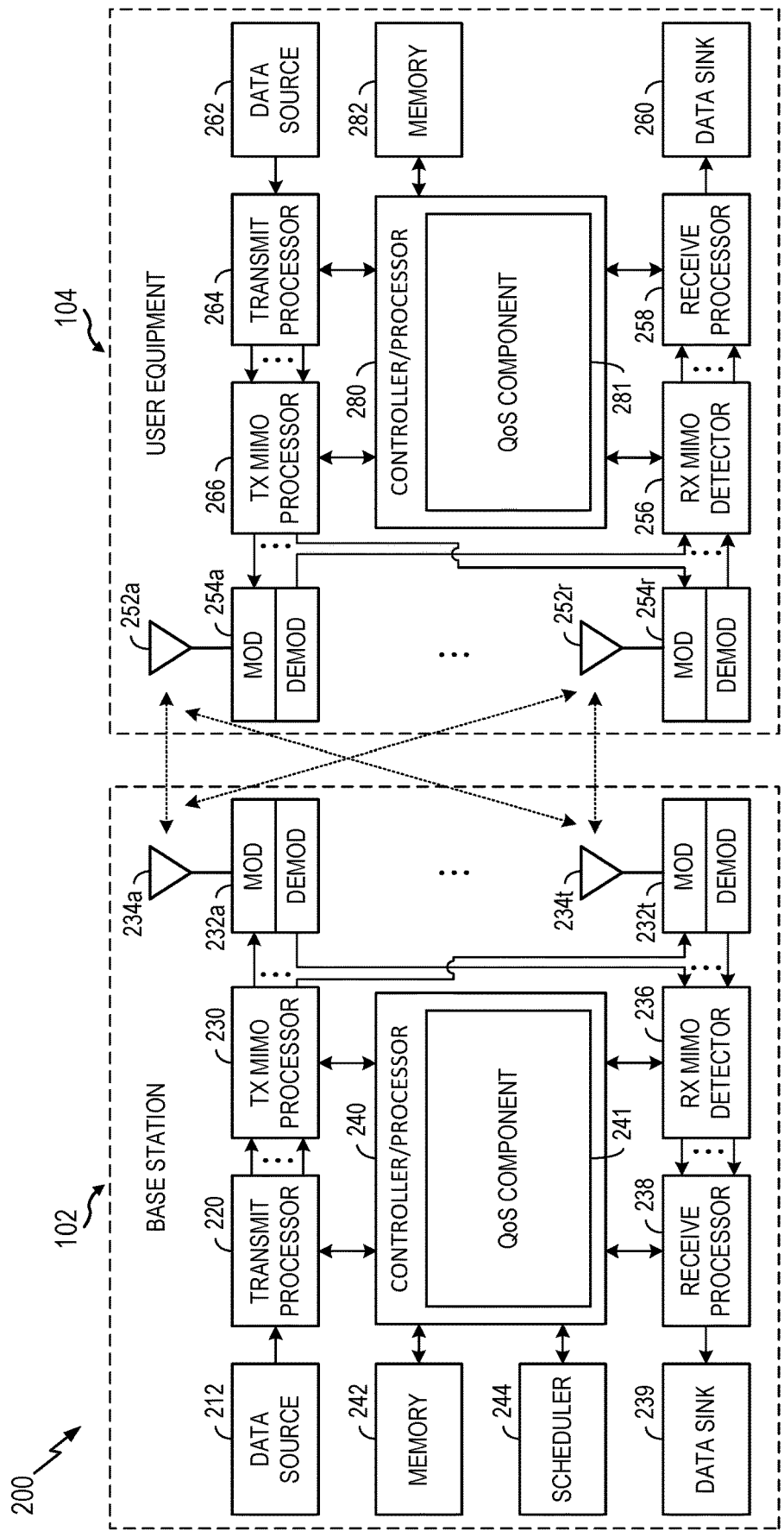
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes QoS component 241, which may be representative of QoS component 199 of FIG. 1. Notably, while depicted as an aspect of controller/processor 240, QoS component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes QoS component 281, which may be representative of QoS component 198 of FIG. 1. Notably, while depicted as an aspect of controller/processor 280, QoS component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Quality of Service Architecture

A fifth generation (5G) quality of service (QoS) model is based on QoS flows and supports both QoS flows that require guaranteed flow bit rate (e.g., GBR QoS flows) and QoS flows that do not require guaranteed flow bit rate (e.g., non-GBR QoS flows). At a non-access stratum (NAS) level, the QoS flow is the finest granularity of QoS differentiation in a protocol data unit (PDU) session.

Figure 4:
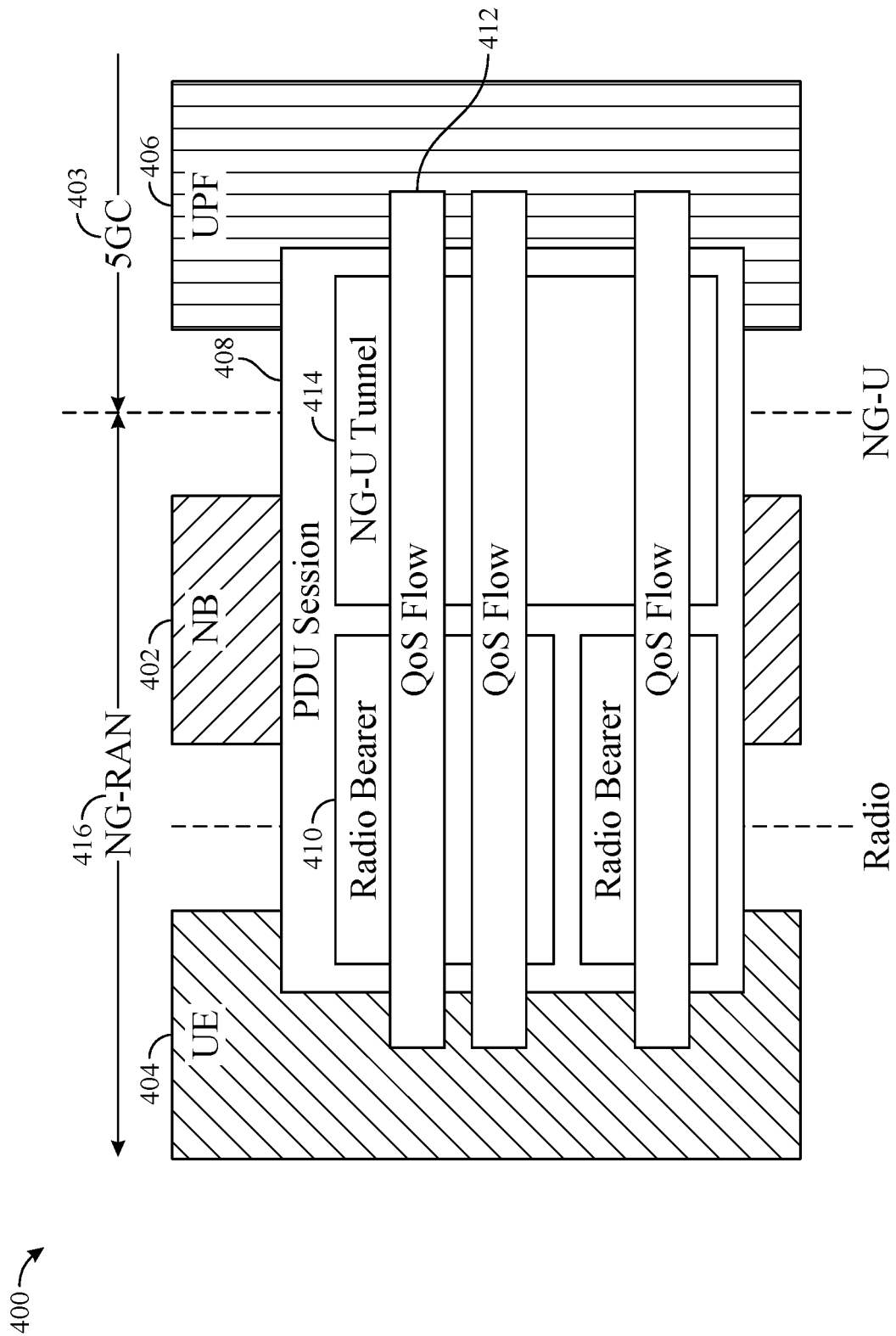
FIG. 4 provides an illustration of an example quality of service (QoS) architecture in certain wireless communication networks.

FIG. 4 provides an illustration of a QoS architecture 400 in 5G wireless communication systems. As shown, a base station 402 may provide a communication pathway within a 5G radio access network (RAN) 416 between a UE 404 and a user plane function (UPF) 406 of a 5G core (5GC) network 403. The UPF 406 is responsible for packet routing and forwarding, packet inspection, QoS handling, and external PDU session for interconnecting Data Networks (DNs) in the 5G architecture. Accordingly, to transmit and receive data, the UE 404 may establish one or more protocol data unit (PDU) sessions 408 with the UPF 406 via the base station 402. As shown, each of the one or more PDU sessions 408 may include at least one data radio bearer (DRB) 410 and one or more QoS flows 412 for carrying user data packets for the UE 404. The one or more QoS flows 412 may be identified within the one or more PDU sessions 408 by a QoS Flow ID (QFI) carried in an encapsulation header of a packet over an N3 general packet radio service tunneling protocol for the user plane (NG-U) 414.

In some cases, the 5GC 403 may map packets belonging to different PDU sessions to different DRBs. Hence, the NG-RAN establishes at least one default DRB for each PDU session. Additionally, NAS level packet filters in the UE 404 and in the 5GC 403 may associate uplink (UL) and downlink (DL) packets with QoS flows, while access stratum (AS) level mapping rules in the UE and in the 5G radio access network (RAN) associate UL and DL QoS flows with DRBs. In some cases, the NG-RAN 416 and 5GC 403 may ensure quality of service (e.g. reliability and target delay) by mapping packets to appropriate QoS flows and DRBs. Thus, there may be a two-step mapping of internet protocol (IP) flows to QoS flows (e.g., NAS) and from QoS flows to DRBs (e.g., AS).

At NAS level, a QoS flow is characterized by a QoS profile provided by 5GC to NG-RAN and QoS rule(s) provided by 5GC to the UE. The QoS profile is used by NG-RAN to determine the treatment on the radio interface while the QoS rules dictates the mapping between uplink user plane traffic and QoS flows to the UE. A QoS flow may either be GBR or Non-GBR depending on its profile. The QoS profile of each QoS flow contains QoS parameters, such as a 5G QoS Identifier (5QI), an allocation and retention priority (ARP). Further, in case of a GBR QoS flow only, the QoS parameters may additionally include a guaranteed flow bit rate (GFBR) for both uplink and downlink, a maximum flow bit rate (MFBR) for both uplink and downlink, and a maximum packet loss rate for both uplink and downlink. Additionally, in the case of non-GBR QoS only, the QoS parameters may include a reflective QoS attribute (RQA). The RQA, when included, indicates that some (not necessarily all) traffic carried on a corresponding QoS flow is subject to reflective quality of service (RQoS) at NAS.

Additionally, an aggregate maximum bit rate may be associated to each PDU session (e.g., session-AMBR) and to each UE (e.g., UE-AMBR). The session-AMBR limits the aggregate bit rate that can be expected to be provided across all non-GBR QoS flows for a specific PDU Session. The UE-AMBR limits the aggregate bit rate that can be expected to be provided across all non-GBR QoS flows of a UE.

In some cases, the 5QI may be associated to certain QoS characteristics giving guidelines for setting node specific parameters for each QoS flow. In some cases, standardized or pre-configured 5G QoS characteristics may be derived by the UE 404 from the 5QI and are not explicitly signaled. In other cases, signaled QoS characteristics may be included as part of the QoS profile and may include, for example, a resource type (e.g., GBR, delay critical GBR or Non-GBR), a priority level, a packet delay budget, a packet error rate, an averaging window, and a maximum data burst volume.

At access stratum level, the DRB may define packet treatment on a radio interface (Uu) between the UE 404 and base station 402. A DRB serves packets with the same packet forwarding treatment. The QoS flow to DRB mapping by NG-RAN 416 (e.g., base station 402) may be based on QFI and the associated QoS profiles (e.g., QoS parameters and QoS characteristics). Separate DRBs may be established for QoS flows requiring different packet forwarding treatment, or several QoS flows belonging to the same PDU session can be multiplexed in the same DRB.

In the uplink, the NG-RAN 416 may control the mapping of QoS flows to DRB in two different ways: (1) reflective mapping and (2) explicit configuration. In reflective mapping (e.g., also known as RQoS), for each DRB, the UE 404 may monitor the QFI(s) of the downlink packets and applies the same mapping in the uplink. In other words, for a DRB, the UE 404 maps the uplink packets belonging to the QoS flows(s) corresponding to the QFI(s) and PDU session observed in the downlink packets for that DRB. To enable this reflective mapping, the NG-RAN 416 marks downlink packets over Uu with QFI. For explicit configuration, besides the reflective mapping, the NG-RAN may configure by RRC an uplink QoS flow to DRB mapping. In either case, the UE 404 may apply the latest update (e.g., in time) of the mapping rules regardless of whether it is performed via reflecting mapping or explicit configuration.

In the downlink, the QFI may be signal by the base station 402 in NG-RAN 416 over Uu for the purpose of RQoS and, if neither the bases station 402 of NG-RAN 416 nor the NAS of UE 404 intend to use reflective mapping for the QoS flow(s) carried in a DRB (e.g., as indicated by the RQA), no QFI may be for that DRB over Uu. In the uplink, NG-R the base station 402 in NG-RAN 416 can configure the UE 404 to signal QFI over Uu.

As noted above, for each PDU session, a default DRB is configured. If an incoming UL packet matches neither a radio resource control (RRC) configured nor a reflective QFI to DRB mapping, the UE 404 may map that packet to the default DRB of the PDU session.

Within each PDU session, it is up to the base station 402 in NG-RAN 416 how to map multiple QoS flows to a DRB. The base station 402 in NG-RAN 416 may map a GBR flow and a non-GBR flow, or more than one GBR flow to the same DRB. The timing of establishing non-default DRB(s) between the base station 402 in NG-RAN 416 and UE 404 for QoS flow configured during establishing a PDU session can be different from the time when the PDU session is established. It is up to the base station 402 in NG-RAN 416 when non-default DRBs are established.

Figure 5:
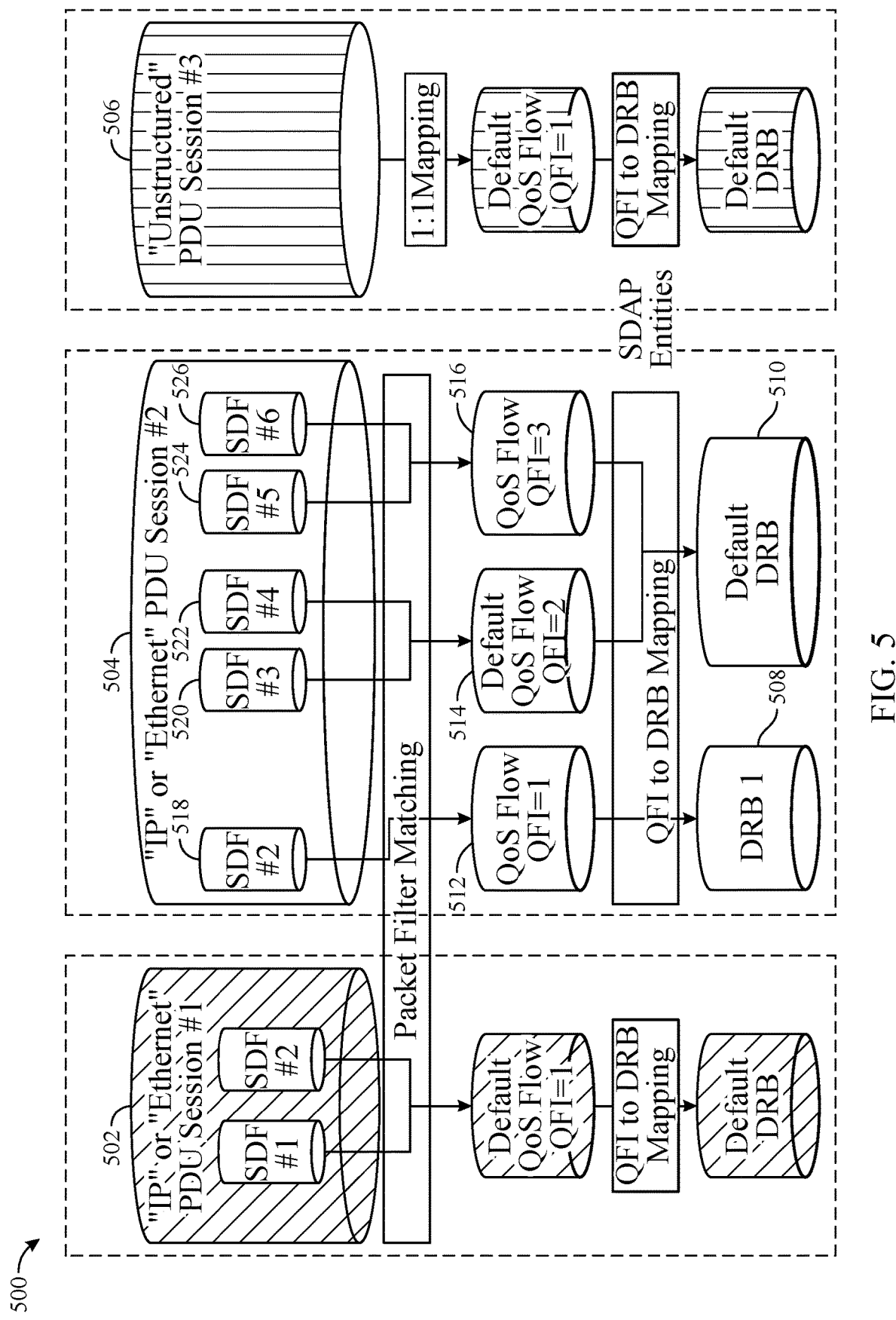
FIG. 5 provides an illustration of a two-step process of mapping packets to data radio bearers (DRBs) within a protocol data unit (PDU) session.

FIG. 5 provides an illustration of a two-step process 500 of mapping packets to DRBs within a PDU session. As noted above, within a PDU session, the two-step mapping may include mapping IP flows to QoS flows (e.g., within NAS) and mapping QoS flows to DRBs (e.g., within AS). As shown, a UE may have multiple PDU sessions, such as PDU session 502, PDU session 504, and PDU session 506. Each PDU session of a UE can have multiple DRBs, each DRB can have multiple QoS flows (e.g., identified by a QFI), and each QFI may contain multiple service data flows (SDFs). For example, as illustrated, the PDU session 504 may have two DRBs, such as DRB 508 and DRB 510. Further, a first QoS flow 512 (e.g., identified by a first QFI) may map to the DRB 508, while a second QoS flow 514 (e.g., identified by a second QFI) and a third QoS flow 516 (e.g., identified by a third QFI) may map to the second DRB 510. This mapping between QoS flows and DRBs may be known as a QFI-to-DRB mapping. Additionally, a first SDF 518 may map to the first QoS flow 512 while a second SDF 520 and a third SDF 522 may map to the second QoS flow 514 and a fourth SDF 524 and a fifth SDF 526 may map to the third QoS flow 516. This mapping between SDFs and QoS flows may be known as a packet filter (PF)-to-DRB mapping. For ease of understanding, a SDF, as used herein, may be conceptually viewed as the data/packets/frames from one set of applications in a UE.

Example NAS RQoS

As noted above, in some cases, reflective QoS (RQoS) mapping may be used. When operating under RQoS, for each DRB, a UE may monitor the QFI(s) of downlink user data packets and may apply the same PF-to-QFI and/or QFI-to-DRB mapping in the uplink, depending on whether the RQoS is for NAS or AS. For NAS RQoS, the UE may apply the same PF-to-QFI mapping for downlink user data packets as for uplink user data packets. For AS RQoS, the UE may apply the same QFI-to-DRB mapping for downlink user data packets as for uplink user data packets.

Figure 6:
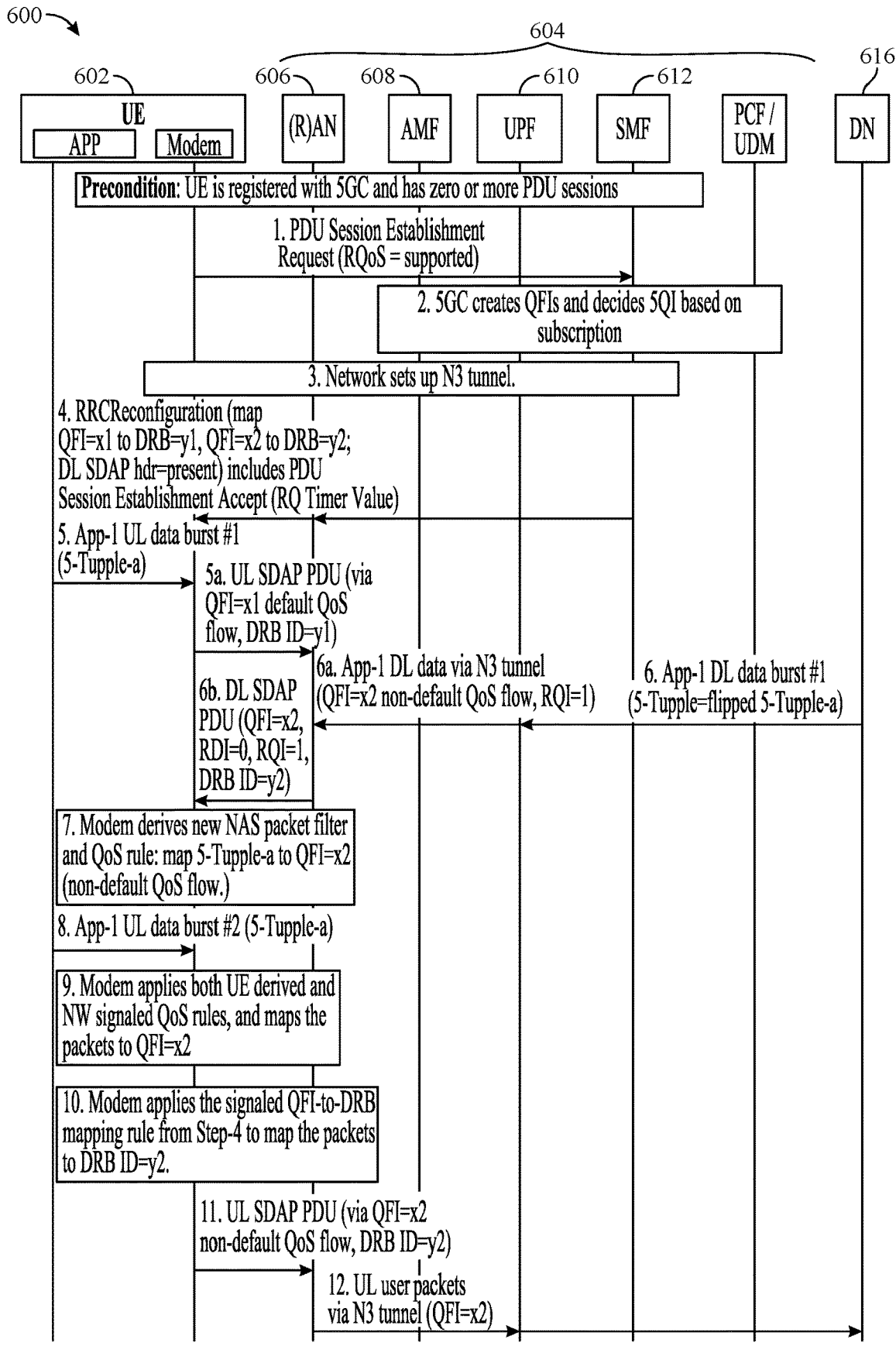
FIG. 6 is a call flow illustrating a process for establishing a PDU session with NAS reflective QoS mapping.

FIG. 6 is a call flow illustrating a process 600 for establishing a PDU session with NAS RQoS mapping (and without AS RQoS mapping). More specifically, in the process 600, a UE 602 may request to establish a new PDU session (e.g., triggered an application in the UE 602) with a 5G core (5GC) network 604 and the 5GC network 604 decides to use NAS reflective QoS and no AS RQoS for the new PDU session. The process 600 may assume certain preconditions, such as the UE is registered with the 5GC network 604 of the 5GC network 604 and a UE subscription allows IPv4, IPv6, IPv4v6 or Ethernet PDU types.

As shown, in step 1, the UE 602 sends a "PDU Session Establishment Request" message to session management function (SMF) 612 of the 5GC network 604. In the "PDU Session Establishment Request" message, the UE 602 sets RQoS bit to "Reflective QoS supported" in a 5GSM capability IE (e.g., which is different than 4G evolved packet core (EPC)). The UE 602 may also set PDU session type to "IPv4v6", "IPv4", or "IPv6", or "Ethernet".

At step 2, the 5GC network 604 creates QFIs and decides a 5QI based on a subscription associated with the UE 602. For example, for downlink traffic, the SMF 612 sends reflective QoS indication (RQI) to the UPF 610 to activate reflective QoS per SDF for a given QFI. Thereafter, the SMF 612 sends to NG-RAN 606 (e.g., via AMF 608) QoS profiles containing the optional parameter reflective QoS attribute (RQA). Each QoS profile corresponds to a QFI. The presence of RQA indicates that certain traffic (not necessarily all) carried on this QFI may be subject to RQoS. The QoS profile provides the NG-RAN 606 with the mapping between QoS parameters and QFI.

Thereafter, at step 3, the 5GC network 604 may set up an N3 tunnel for the PDU session.

As shown at step 4, the NG-RAN 606 may then configure the UE 602 with new DRBs, QFI-to-DRB mapping rules and DL SDAP header for the PDU session via RRC signaling (e.g., RRC reconfiguration). In some cases, in the absence of AS RQoS, the NG-RAN 606 configures DL SDAP header for a DRB mainly based on the RQA. In other words, the NG-RAN 606 configures the DL SDAP header mainly when the RQA is present in the QoS profile of at least one QoS flows within the DRB. As illustrated in FIG. 6, the RRC signaling may include an indication that, for example, QFI x1 is mapped to DRB ID y1 and QFI x2 is mapped to DRB ID y2. Additionally, the UE receives a "PDU Session Establishment Accept" from SMF 612 with a reflective QoS (RQ) timer value in an RQ timer IE. Here, the RQ timer value is neither "deactivated" nor zero, which implies that the SMF 612 enables the UE 602 with NAS Reflective QoS for this PDU session. The PDU Session Establishment Accept message may contain the default QoS rule, such as {match-all filter, QFI=x1, precedence value=255}

At step 5, an application in the UE 602 (e.g., App-1) sends UL data burst #1 with TCP/IP 5-Tupple=5-Tupple-a. In some cases, the TCP/IP 5-Tupple includes source/destination IP address, source/destination port and protocol. In some cases, at step 5a, the UE 602 matches the UL data packets against the UL packet filters in existing QoS mapping rules. In some cases, the UE has only network-signaled QoS mapping rules and no UE-derived QoS mapping rules at the point of time of step 5. The UL data packet's 5-Tupple is 5-Tupple-a which matches the UL packet filter of the default QoS mapping rule (e.g., QFI=x1). As noted, QFI=x1 may be configured in step 4 to be mapped to DRB ID=y1. Accordingly, the UL data burst #1 may be sent via QFI=x1 (e.g., default QoS flow) and DRB ID=y1.

In response to the App-1's UL data burst #1, the data network 616 sends a DL data burst #1 to App-1 of the UE 602 at step 6. The TCP/IP 5-Tupple-a-dl of DL packets of the DL data burst may be a source-destination-swapped version of 5-Tupple-a. For example, the DL packet's source IP address/port are the same as the UL packet's destination IP address/port, respectively.

At step 6A, the UPF 610 matches the DL packets against DL packet filters from packet detection rules (PDR). In some cases, the 5-Tupple-a-dl matches a DL PDR that has NAS RQoS activated and is associated with QFI=x2. The UPF 610 may set QFI=x2 and RQI=1 in an encapsulation header on a N3 reference point for every DL packet corresponding to an SDF.

At step 6B, when an RQI=1 is received by the NG-RAN 606 in a DL packet on the N3 reference point, the NG-RAN 606 may indicate to the UE 602 the QFI and the RQI of that DL packet in the SDAP header. As illustrated, the NG-RAN 606 may map the QFI=x2 packets to DRB ID=y2.

At step 7, the UE 602 (e.g., a modem in the UE 602) may derive a new QoS mapping rule containing QFI=x and a packet filter 5-Tupple-a based on the DL SDAP PDU. The derived QoS mapping rule may have a fixed precedence value 80 and maps 5-Tupple-a to the QoS Flow with QFI=x2 (e.g., non-default QoS flow).

At step 8, App-1 of the UE 602 sends UL data burst #2 with TCP/IP 5-Tupple=5-Tupple-a.

At step 9, the UE 602 applies both UE-derived and network-configured QoS rules, and associates the packet with QFI=x2. Although both NW-signaled default QoS rule (e.g., precedence value 255) and the UE-derived QoS rule (e.g., precedence value 80) match UE UL packet, the UE 602 may associate UL packets of the UL data burst #2 with the UE-derived QoS rule because of its lower precedence value.

At step 10, the UE 602 applies the signaled QFI-to-DRB mapping rule from step 4 to map the packets to DRB ID=y2.

At step 11, the modem of the UE 602 may include the UL user data packet in an UL SDAP PDU and sends it via QFI=x2 and the DRB with DRB ID=y2.

At step 12, the NG-RAN 606 forwards the user data packet to UPF 610 via N3 tunnel with QFI=x2 in the tunnel header.

After performing the process 600 illustrated in FIG. 6, the UE can transfer UL and DL data via the established PDU session. The UE 602 may enforce UL QoS via both the UE derived QoS mapping rules and the QoS mapping rules from explicit NAS signaling. Upon timer expiry of a T3583 associated with a UE-derived QoS mapping rule, the UE 602 deletes the corresponding UE derived QoS rule and stops the T3583. Upon receiving a DL SDAP PDU associated with an existing UE derived QoS rule, the UE 602 restarts the T3583 timer of the UE derived QoS rule.

Example AS RQoS

Figure 7:
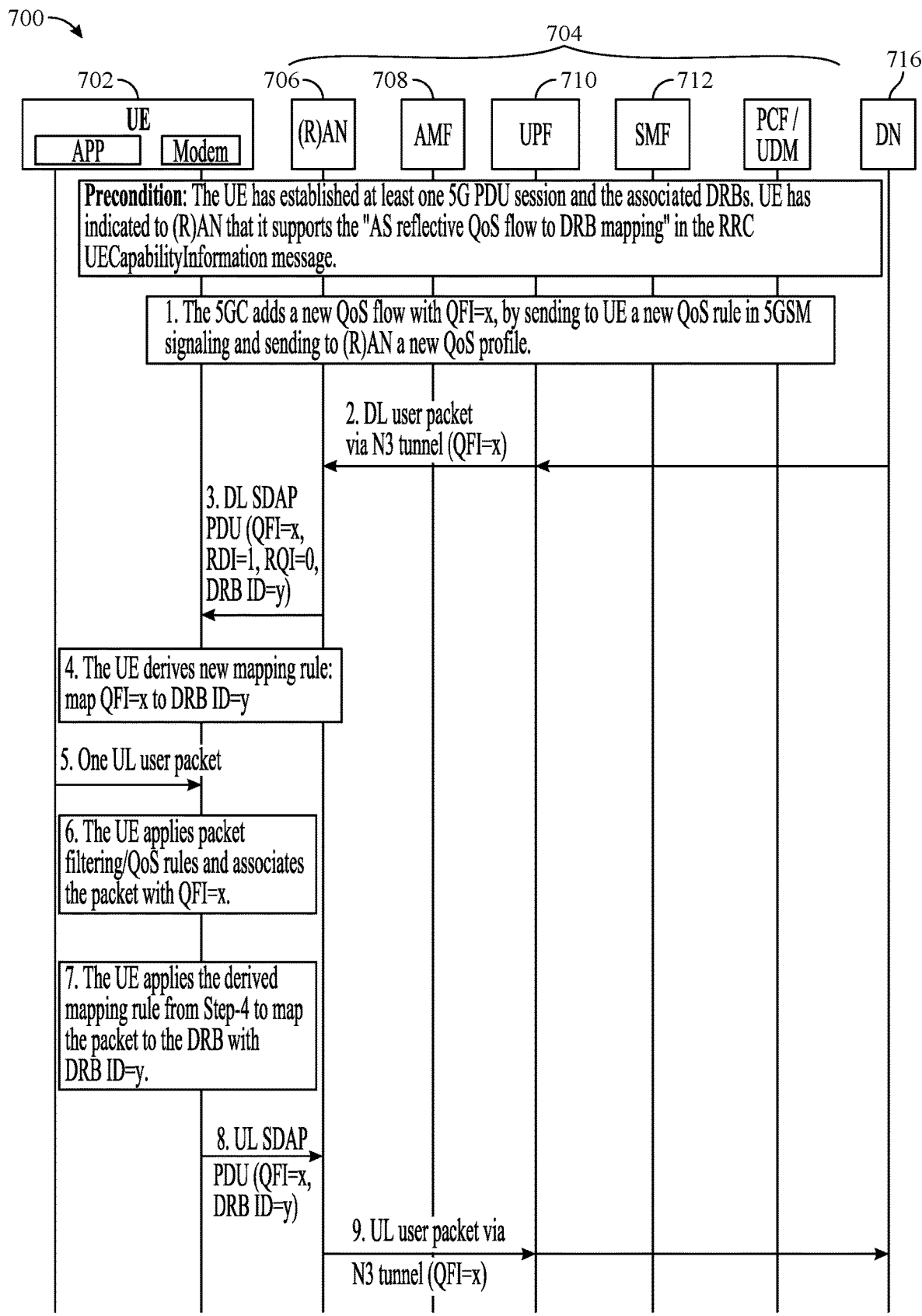
FIG. 7 is a call flow illustrating a process for deriving a QoS flow (QFI)-to-DRB mapping.

As noted above, AS RQoS, the UE may apply the same QFI-to-DRB mapping for downlink user data packets as for uplink user data packets. FIG. 7 is a call flow illustrating a process 700 for deriving QoS-flow-to-DRB mapping. In some cases, explicit NAS QoS signaling (e.g., as opposed to NAS RQoS) may be used to configure the UE 702 with uplink packet filters. In some cases, the process 700 may assume certain preconditions, such as the UE 702 has indicated to NG-RAN 706 that it supports AS RQoS (e.g., via a parameter as-ReflectiveQoS) in an RRC UECapabilityInformation message. Additionally, the preconditions may include the UE being in RRC_Connected mode and has established at least one 5G PDU sessions and the associated DRBs. In some cases, the process 700 may be triggered by 5GC network 704 when adding a new QoS flow with QFI=x and by sending to the UE 702 a new QoS mapping rule via 5GSM signaling and sending to NG-RAN 706 a new QoS profile.

For example, as shown at step 1, the 5GC network 704 adds a new QoS flow with QFI=x, by sending a PDU session modification command message to the UE 702 with new QoS rules and sending new QoS profiles to the NG-RAN 706. The NG-RAN 706 decides to use AS RQoS to map the new QFI=x to an existing DRB with DRB ID=y.

At step 2, the DN 716 sends a DL user packet to the UE 702. The UPF 710 forwards the DL user packet to NG-RAN 706 via N3 tunnel with QFI=x in the tunnel header.

At step 3, the NG-RAN 706 sends the user packet to the UE 702 in an SDAP PDU where the SDAP header contains QFI=x, RDI=1 and RQI=0.

At step 4, the UE derives a new QoS mapping rule based on the DL SDAP PDU. For example, the QoS mapping rule may map QFI=x to DRB ID=y based on the DL SDAP PDU.

At step 5, an application of the UE 702 (e.g., APP) sends an uplink user packet to a modem of the UE 702.

At step 6, the (modem of the) UE 702 applies packet filtering and associates the uplink user packet with QFI=x.

At step 7, the UE 702 applies the derived mapping rule from step 4 to map the packet to the DRB with DRB ID=y.

At step 8, the UE 702 includes the UL user data packet in an UL SDAP PDU and sends it to the NG-RAN 706 via QFI=x and the DRB with DRB ID=y.

At step 9, the NG-RAN 706 forwards the user packet to the UPF via N3 tunnel with QFI=x in the tunnel header.

In some cases, the UE sends UL data for QFI=x via the DRB with DRB ID=y in the PDU session. In some cases, the UE may store and enforce the UE-derived QoS flow-to-DRB mapping rule (e.g., map QFI=x to the DRB with DRB ID=y) from the time it is created to the time when one of the following events happens: (1) the UE 702 transitions to RRC_Idle state, (2) the mapped DRB with DRB ID=y is released, (3) RRC signaling explicitly releases the mapping rule but does not release the DRB with DRB ID=y, (e.g., QFI=x is included in SDAP-Config→mappedQoS-FlowsToRelease), (4) RRC signaling explicitly re-maps QFI=x to another DRB with DRB ID=y2, or (5) the UE 702 derives another mapping rule (e.g., map QFI=x to the DRB with DRB ID=y2).

Example NAS RQoS Mapping Procedure

In some cases, when NAS RQoS mapping is configured, a UE may perform the following procedure to derive a QoS mapping rule (e.g., packet filter to QFI mapping rule) for each DL SDAP PDU received in a DRB with SDAP header parameter RQI=1. For example, in some cases, the UE may receive one or more DL SDAP PDUs that include RQI=1. In response, the UE may extract a QFI value (e.g., denoted as QFI0) from SDAP header. Thereafter, the UE may derive an UL packet filter (e.g., denoted as PF0), based on the received downlink SDAP data PDU, by applying the process 600 and extracting 5-tupple (IP address, protocol, ports) from TCP/UDP/IP headers. The UE may then search for the derived packet filter PF0 in an existing stored derived QoS mapping rule table, as shown below in Table 1.

TABLE 1

Example QoS mapping rule table for PF to QFI mapping

| Rule index | UE derived UL packet filter | QFI value | Precedence value | The remaining validity time of timer T3583 |
|---|---|---|---|---|
| 1 | PF1 | QFI1 | 80 | T1 |
| 2 | PF2 | QFI2 | 80 | T2 |
| 3 | PF3 | QFI3 | 80 | T3 |
| ... | ... | ... | ... | ... |

In some cases, based on the searching, if the packet filter PF0 matches a QoS mapping rule in the table, the UE may overwrite the QFI of the matched QoS rule with QFI0 and restart the associated timer T3583 of the rule. Otherwise, the UE may add a new QoS rule={PF0, QFI0, precedence value 80 (decimal)} to the table and start a new timer T3583 associated with this rule.

As noted, the UE may derive the UL packet filter based on the received downlink SDAP data PDU (e.g., downlink packet). An example downlink SDAP data PDU is illustrated below in Table 2.

TABLE 2

Example downlink SDAP data PDU

| Reflective QoS flow to DRB mapping Indication (RDI) (1 bit) | Reflective QoS Indicator (RQI) (1 bit) = 1 | QoS Flow ID (QFI) (6 bits) = 3 | DL SDAP header (1 Byte) |
|---|---|---|---|
| Version (4 bits) | | Header Length (4 bits) | IPv4 header |
| ... | | | |
| Protocol (8 bits) = 6 (i.e., TCP) | | | |
| ... | | | |
| Source Address (32 bits) = 10.10.10.10 | | | |
| Destination Address (32 bits) = 20.20.20.20 | | | |
| ... | | | |
| Source Port Number (16 bits) = 10 | | | TCP header |
| Destination Port Number (16 bits) = 20 | | | |
| ... | | | |

For example, the UE may extracts the QFI and RQI of the received downlink packet. In the example shown in Table 2, the QFI=3 and the RQI=1. Accordingly, the UE derives a new packet filter for the QoS flow (QFI=3) of this downlink packet. Further, as shown, the downlink SDAP data PDU (e.g., downlink packet) is IPv4 TCP and has the following 5-tuple parameters in the IPv4 and TCP headers: (1) source IP address of the downlink packet=10.10.10.10, (2) destination IP address of the downlink packet=20.20.20.20, (3) source port number of the downlink packet=10, (4) destination port number of the downlink packet=20, and (5) protocol identifier (or next header type) of the downlink packet=6 (e.g., TCP). In some cases, the 5-tuple parameters from which the packet filter may be derived may further include, for example, (6) a security parameter index of the downlink packet, (7) a destination MAC address of the downlink packet, (8) a source MAC address of the downlink packet, (9) an 802.1Q C-TAG VID of the downlink packet, (10) an 802.1Q C-TAG PCP/DEI of the downlink packet, (11) an 802.1Q S-TAG VID of the downlink packet, and/or (12) an 802.1Q S-TAG PCP/DEI of the downlink packet.

The UE may then derive an uplink packet filter (e.g., PF0) as shown below in Table 3. The UE may associate this uplink packet filter with the QFI 3 of the DL packet above. Accordingly, when uplink data packets match the packet filter PF0 illustrated in Table 3 (e.g., the packets have the same 5-tupple as in the packet filter PF0), these uplink data packets may be associated to the QoS flow with QFI=3.

TABLE 3

Example UE-Derived Packet Filter

Destination IP address = 10.10.10.10
Source IP address = 20.20.20.20
Destination port number = 10
Source port number = 20
Protocol = 6

After deriving the packet filter, the UE may derive a new QoS mapping rule (e.g., packet filer to QFI mapping rule), as noted above, such as {QFI=3, precedence value 80, PF0}. Because this is a UE-derived QoS mapping rule, the precedence value associated with this QoS mapping rule may be set to 80. The example of deriving the packet filter and QoS mapping rule presented above relates to IPv4/TCP. However, the UE may also support all the following combinations IPv4/TCP, IPv4/UDP, IPv4/ESP, IPv6/TCP, IPv6/UDP, IPv6/ESP, and/or Ethernet packet.

Example AS RQoS Mapping Procedure

In some cases, when AS RQoS mapping is configured, a UE may perform the following procedure to derive a QoS mapping rule (e.g., QFI to DRB mapping rule) for each DL SDAP PDU received in a DRB with SDAP header parameter RQI=1. An example downlink SDAP data PDU is illustrated below in Table 4.

TABLE 4

Example downlink SDAP data PDU

| RDI (1 bit) | RQI (1 bit) | QFI (6 bits) | DL SDAP header |
|---|---|---|---|
| SDAP SDU/Payload (e.g., IP or Ethernet packet) | | | DL SDAP SDU/Payload |

In some cases, UE receives a DL SDAP PDU1 from DRB-y (DRB ID=y), as illustrated in Table 4. Thereafter, the UE may extract the RDI and QFI from the DL SDAP header of PDU1. In some cases, if RDI=1, the UE may derive an uplink QFI-to-DRB mapping rule, as shown in Table 5.

TABLE 5

Example uplink QFI-to-DRB mapping rule

{x,y}, i.e., map QoS flow (QFI = x) to DRB-y (DRB ID = y).

In Table 5, x is the QFI parameter value in the DL SDAP PDU header and y is the DRB ID of the DRB in which the DL SDAP PDU is received. In other cases, if RDI=0, the UE does not derive the QFI-to-DRB mapping rule.

After deriving the QFI-to-DRB mapping rule, the UE may search for a mapping rule with QFI=x in a stored QFI-to-DRB mapping rule table, which includes both network-signaled and UE-derived mapping rules. Table 6, below, provides an example QFI-to-DRB mapping rule table.

TABLE 6

Example QFI-to-DRB mapping rule table

| Rule index | PDU session ID | QFI | DRB ID |
|---|---|---|---|
| 1 | PSI-1 | x1 | y1 |
| 2 | PSI-1 | x2 | x2 |
| ... | | ... | ... |

In the example shown in Table 6, the UE may determine that Rule 1 has QFI=x1 mapped to DRB ID=y2. Accordingly, in such cases, the UE may replace Rule 1 with the QFI-to-DRB mapping rule shown in Table 5 and trigger re-mapping procedure to re-map QFI=x1 from DRB y2 to DRB y (e.g., based on an end-marker SDAP control PDU). Otherwise, if the QFI-to-DRB mapping rule of Table 5 does not match any QFI-to-DRB mapping rule stored in the QFI-to-DRB mapping rule table of Table 6, the UE may add the QFI-to-DRB mapping rule of Table 5 to the QFI-to-DRB mapping rule table of Table 6.

Example Techniques for Improving RQoS Implementation

As can be seen above, when RQoS is used, the UE may need to perform packet filtering involving determining whether one or more QoS mapping rules (e.g., also known as RQoS mapping rules) exist for received downlink user data packets. If no such RQoS mapping rules exist, the UE may then need to derive the RQoS mapping rules for these downlink user data packets, such as deriving a PF-to-QFI mapping rule or a QFI-to-DRB mapping rule (e.g., depending on whether NAS RQoS or AS RQoS is configured). However, as noted above, RQoS requires the UE to inspect the SDAP headers and TCP/UDP/IP header for every downlink user data packet. In 5G, the downlink data rate can be greater than 10 gigabits per second (Gbps). Accordingly, since it is mandatory to set the RQI to one (e.g., indicating RQoS is configured) for every downlink user data packet of an IP flow if the IP flow is enabled with NAS RQoS, the UE inspects about one million packets per second for this 10 Gbps data rate in 5G.

Such packet inspection may be implemented in RQoS logic in the UE in different manners. For example, in some cases, RQoS logic (e.g., for implementing processes 600 and 700, including packet inspection and packet filter construction) may be implemented in dedicated hardware, such as an application specific integrated circuit (ASIC). However, implementing the RQoS logic in this manner may have a slow time to market because hardware development cycles are generally long. Additionally, implementing the RQoS logic in dedicated hardware is associated with a high monetary cost due to the high cost of research and development.

Another manner of implementing the RQoS logic may be to implement the RQoS logic in software. However, implementing the RQoS logic in software may require the UE to perform a higher number of computations (e.g., millions of instructions per second (MIPS)) for inspecting all of the downlink user data packets. Moreover, as a result of the higher number of computations, higher power consumption may be experienced at the UE, leading to a reduction of battery run-time as well as, in some cases, the UE overheating.

Therefore, aspects of the present disclosure provide techniques for implementing RQoS without the negative effects associated with the dedicated hardware and software described above. For example, such techniques may include implementing RQoS (e.g., including packet inspection, packet filter construction, and QoS mapping rule derivation) in software that requires a lower number of computations. To achieve this lower number of computations, such techniques may include only inspecting a subset of downlink user data packets received by the UE (e.g., as opposed to inspecting all of the downlink user data packets) and deriving the QoS mapping rules based on the subset of inspected downlink user data packets, as explained below in greater detail. Further, such techniques may leverage existing hardware of the UE as opposed to using customized hardware that is configured specifically for RQoS implementation. Accordingly, in addition to the low number of computations (and therefore reduced power consumption) the hardware costs associated with these techniques may be low.

Additionally, it should be noted that, while the techniques presented below are described primarily in relation to 5G RQoS technology, these techniques may be applied equally to other types of technologies that implement RQoS technology, such as sixth generation (6G) wireless technologies and beyond. Moreover, the techniques presented herein may additionally apply to situations in which a handover occurs from a legacy technology (e.g., technologies older than 6G or beyond) to 6G or beyond technologies.

Figure 8:
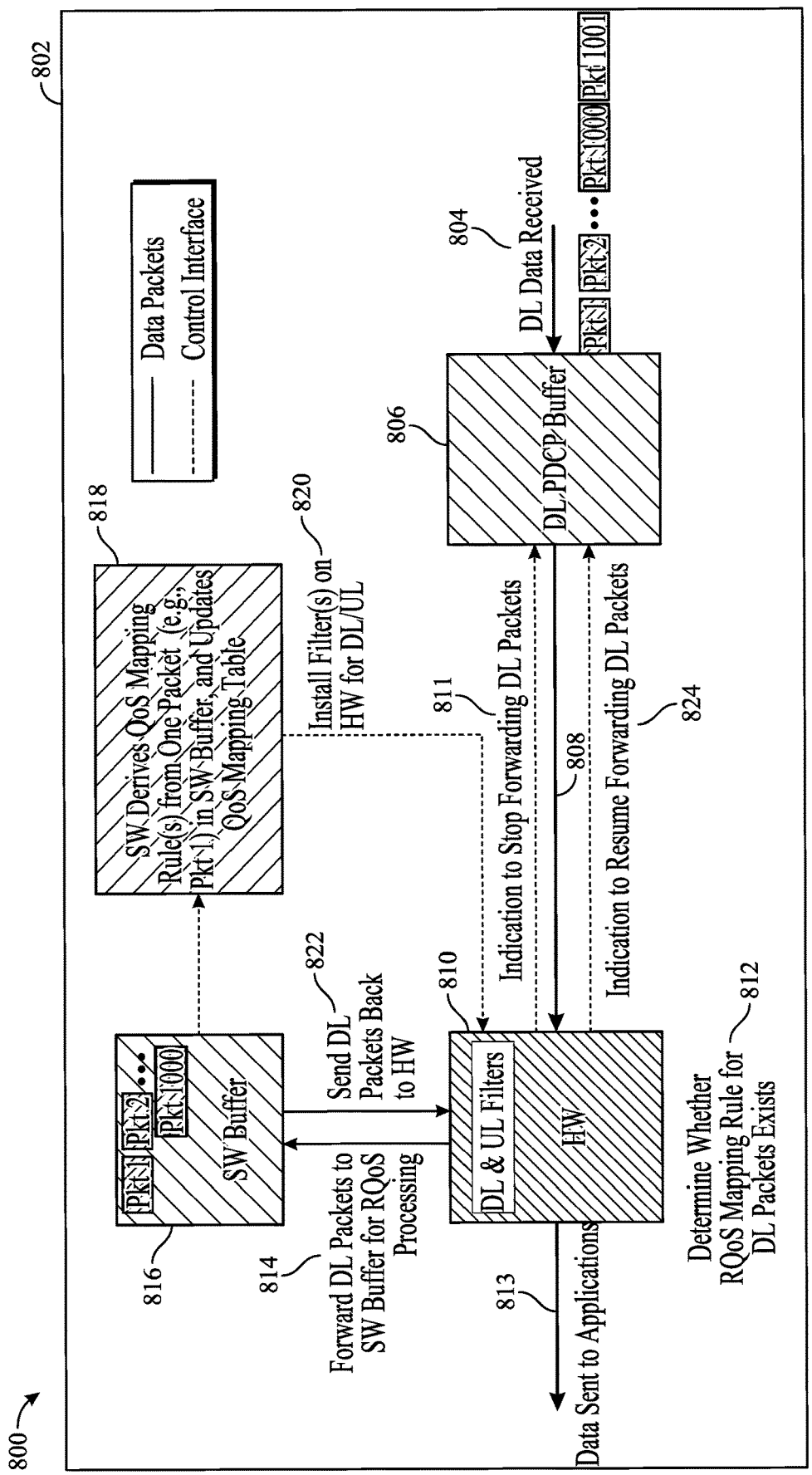
FIG. 8 illustrates a flow diagram of operations performed by a user equipment (UE) for implementing reflective QoS.

FIG. 8 illustrates a flow diagram of operations 800 performed by a UE 802 for implementing RQoS (e.g., including packet inspection, packet filter construction, and QoS mapping rule derivation). In some cases, the UE 802 may be an example of the UE 104 illustrated in FIG. 1.

As shown, at 804, the UE 802 may receive a plurality of downlink user data packets from a first base station (BS), such as the BS 102 illustrated in FIG. 1. For example, as illustrated, the plurality of downlink user data packets may include packets (Pkt) 1-1000, which may be associated with a first application of the UE 802, and packet 1001, which may be associated with a second application of the UE 802. In some cases, the plurality of downlink user data packets may be examples of the downlink packets illustrated in Table 2 and/or Table 4, above.

As shown, the plurality of downlink user data packets may be stored in a lower layer buffer, such as the DL PDCP buffer 806. Thereafter, at 808, the DL PDCP buffer 806 may forward the plurality of downlink user data packets to packet filtering hardware 810. In some cases, the packet filtering hardware 810 may include one or more of the components of the UE 104 of FIG. 2, such as the receive processor 258, the transmit processor 264, and/or the control/processor 280.

The packet filtering hardware 810 may be configured with one or more downlink and uplink packet filters that may be used to filter downlink user data packets before sending the downlink user data packets to an appropriate (e.g., corresponding) application. In some cases, the downlink and uplink packet filters may include one or more RQoS mapping rules for routing the downlink user data packets to the appropriate application of the UE. In some cases, the RQoS mapping rules may comprise, for example, a PF-to-QFI mapping rule and/or a QFI-to-DRB mapping rule.

In some cases, the one or more downlink and uplink packet filters may be configured by the BS or may be derived by the UE 802 (as explained in greater detail below). If the BS configures the UE 802 with any UL-only packet filters or bidirectional packet filters, the UE 802 may configure the packet filtering hardware 810 with the BS-configured packet filters with higher priority than UE-derived packet filters into. In 5G NR, packet filter priority may be based on the precedence value, where lower-value filters have higher priority. UE-derived packet filters may have a fixed precedence value 80, while BS-configured packet filters may have a precedence value of 1-255. Accordingly, as can be seen, any BS-configured filters with a precedence value of 1-79 may be required to be installed in the packet filtering hardware 810.

At 812, the UE 802 (e.g., via the packet filtering hardware 810) may determine whether one or more QoS mapping rules already exist for the plurality of downlink user data packets. For example, if the plurality of downlink user data packets match at least one packet filter installed in the packet filtering hardware 810, then it means an RQoS mapping rule exists for the plurality of downlink user data packets. Otherwise, it means that an RQoS mapping rule for the plurality of downlink user data packets does not exist.

Accordingly, in some cases, when at least one RQoS mapping rule is determined to already exist for the plurality of downlink user data packets, the UE 802 may forward at 813 the plurality of downlink user data packets to an appropriate/corresponding application entity of the UE, such as the first application. When, however, at least one RQoS mapping rule is determined not to exist for the plurality of downlink user data packets, the UE may forward at 814 the plurality of downlink user data packets from the packet filtering hardware 810 to a software (SW) buffer 816 of the UE 802 (e.g., memory 282 of the UE 104 of FIG. 2) for RQoS processing to derive a new RQoS mapping rule for the plurality of downlink user data packets. The derived RQoS mapping rule (e.g., PF-to-QFI mapping rule and/or QFI-to-DRB mapping rule) may be used for one or more uplink packet transmissions associated with a same PDU session for the first application to be performed in the future, as described below.

In some cases, the UE 802 may forward at 814 the plurality of downlink user data packets to the SW buffer 816 for RQoS processing (e.g., for deriving the new RQoS mapping rule) based on an indication in the plurality of downlink user data packets, such as RQI. As noted above, the RQI may indicate to the UE 802 that RQoS processing is configured to be performed for the packet containing RQI. In some cases, the indication in the plurality of downlink user data packets (e.g., RQI) may be based on capability information transmitted by the UE. For example, in some cases, the UE 802 may transmit capability information to the BS, indicating that the UE 802 is capable of RQoS. Accordingly, when the UE 802 indicates that it is capable of RQoS, the BS may set an RQI field to one within a downlink user data packet of plurality of downlink user data packets, indicating to the UE 802 that RQoS is configured and to perform RQoS mapping rule determination for the downlink user data packet. In other words, in response to transmitting the capability information, the UE 802 may receive one or more indications (e.g., RQI) to perform RQoS mapping rule determination. As explained below, the UE 802 may determine the at least one RQoS mapping rule based on the indication to perform the RQoS mapping rule determination.

For example, in response to determining that the at least one RQoS mapping rule does not exist for the plurality of downlink user data packets and in response to forwarding the plurality of downlink user data packets (e.g., such as packets 1-1000) to the SW buffer 816, the UE 802 may, at 811, stop the forwarding of the plurality of downlink user data packets from the lower layer buffer (e.g., DL PDCP buffer 806) to the packet filtering hardware 810. In some cases, for example, the UE 802 may stop the forwarding by providing, at 811, control signaling to the lower layer buffer of the UE 802 indicating to the lower layer buffer to stop the forwarding of the plurality of downlink user data packets to the packet filtering hardware 810.

In some cases, the UE 802 may providing the control signaling at 811 to stop the forwarding of the plurality of downlink user data packets when operating in an in-order delivery mode that requires the downlink user data packets to be delivered in order. For example, providing the control signaling at 811 to stop the forwarding of the plurality of downlink user data packets may help ensure that the downlink user data packets are eventually forwarded to the first application at 813 in order. This may reduce the possibility that one or more downlink user data packets of the plurality of user data packets are forwarded to the first application (e.g., out of order) right after the RQoS mapping rule for the (other) plurality of downlink user data packets has been determined and configured into the packet filtering hardware 810. This is because it takes some time to forward the packets 1-1000 from the SW buffer to the first application. For example, new packets for the first application, which may be received later than the packets 1-1000, will match the newly derived RQoS mapping rule, and hence may be forwarded to the first application before the packets 1-1000, causing packets out of order at the first application.

In some cases, when the UE 802 is operating according to an out-of-order delivery mode associated with the plurality of downlink user data packets, the UE 802 may not need to provide the control signaling to the lower layer buffer of the UE to stop the forwarding. In other words, when the UE is operating according to the out-of-order delivery mode associated with the plurality of user data packets and when the at least one RQoS mapping rule is determined not to already exist, the UE 802 does not stop the forwarding of the plurality of downlink user data packets to the packet filtering hardware 810.

According to aspects, once the plurality of downlink user data packets have been forwarded to the SW buffer 816, the UE 802 may determine/derive at 818 at least one RQoS mapping rule for the plurality of downlink user data packets (e.g., which may be based on the one or more indications to perform the RQoS mapping rule determination in the plurality of downlink data user packets). In some cases, to reduce the number of computations associated with determining the at least one RQoS mapping rule, the UE 802 may determine the at least one RQoS mapping rule based on only a subset of the plurality of downlink user data packets as opposed to all of the downlink user data packets of the plurality of downlink user data packets. For example, the UE 802 may determine the at least one RQoS mapping rule by inspecting one or more parameters included within or associated with at least one downlink packet of the subset of the plurality of downlink user data packets. In some cases, the subset may include only one downlink user data packet of the plurality of downlink user data packets. By only having to inspect the one or more parameters included within or associated with the at least one downlink user data packet of the subset, the UE 802 may reduce the number of operations (e.g., MIPS) needed to determine the at least one RQoS mapping rule, thereby conserving power and processing resources.

In some cases, for NAS RQoS, the at least one RQoS mapping rule may comprise a mapping rule that maps a packet filter to a QFI. In such cases, the UE 802 may determine at 818 the packet filter from the one or more inspected parameters within the at least one downlink user data packet. For example, as noted above with respect to Table 2, the one or more inspected downlink parameters may include at least one of (1) a source IP address of the downlink packet, (2) a destination IP address of the downlink packet, (3) a source port number of the downlink packet, (4) a destination port number of the downlink packet, (5) a protocol identifier (or next header type) of the downlink packet (e.g., TCP), (6) a security parameter index of the downlink packet, (7) a destination MAC address of the downlink packet, (8) a source MAC address of the downlink packet, (9) an 802.1Q C-TAG VID of the downlink packet, (10) an 802.1Q C-TAG PCP/DEI of the downlink packet, (11) an 802.1Q S-TAG VID of the downlink packet, and/or (12) an 802.1Q S-TAG PCP/DEI of the downlink packet.

Additionally, the UE 802 may determine the QFI based on the one or more parameters within the at least one downlink user data packet. For example, in such cases, the one or more parameters may include the QFI, as shown above in Table 2 and Table 4.

Accordingly, after determining the packet filter associated with the at least one downlink user data packet as well as the QFI associated with the at least one downlink user data packet, the UE 802 may then generate the at least one RQoS mapping rule by mapping the determined packet filter with the determined QFI.

In some cases, for AS RQoS, the at least one RQoS mapping rule may comprise a mapping rule that maps a QFI to a DRB. In such cases, the one or more parameters of the at least one downlink user data packet inspected by the UE 802 may include the QFI. That is, the UE 802 may determine the QFI by inspecting the one or more parameters of the at least one downlink user data packet, as noted above.

Further, the UE 802 may determine the DRB associated with the at least one downlink user data packet. For example, in some cases, the UE 802 may determine the DRB associated with the at least one downlink data packet based on a DRB over which the at least one downlink user data packet was received.

Accordingly, after determining the QFI associated with the at least one downlink user data packet as well as the DRB associated with the at least one downlink user data packet, the UE 802 may then generate the at least one RQoS mapping rule by mapping the determined QFI with the determined DRB.

Thereafter, once the UE 802 has determined the RQoS mapping rule (e.g., whether it be PF-to-QFI or QFI-to-DRB), the UE 802 may update a stored RQoS mapping rule table with the newly determined RQoS mapping rule for the plurality of downlink packets. The UE 802 may then translate the determined RQoS mapping rule into an expanded packet filter, including parameters such as the determined packet filter, the determined QFI, and/or the determined DRB. In some cases, the expanded packet filter not only contains the one or more parameters for the determined packet filter required by the standards (e.g., as described above in relation to Table 2), but also contains parameters not required by the standards, such as SDAP header parameters, QFI, RDI, RQI, and/or DRB ID parameters. For example, in the case of NAS RQoS, the expanded packet filter may at least include the one or more parameters of the packet filter as well as the determined QFI associated with the determined RQoS mapping rule. For AS RQoS, the expanded packet filter may at least include, for example, the determined QFI and determined DRB (e.g., DRB ID parameters) associated with the determined RQoS mapping rule.

As shown at 820, the UE 802 may then install or configure the packet filtering hardware with the expanded packet filter to perform packet filtering. Further, as shown at 822, the UE may then forward the plurality of downlink user data packets from software buffer 816 back to the packet filtering hardware 810 for filtering.

Accordingly, after forwarding the plurality of downlink user data packets back to the packet filtering hardware 810, packet filtering hardware 810 may again filter the plurality of downlink user data packets based on the expanded packet filter and the at least one RQoS mapping rule associated with the plurality of downlink user data packets. Here, because the UE 802 has previously determined the at least one RQoS mapping rules for the plurality of downlink user data packets, there now exists an RQoS mapping rule and expanded packet filter for the plurality of downlink user data packets. Accordingly, in response, the UE 802 may then forward the plurality of downlink user data packets to the corresponding application entity of the UE 802 based on the filtering, such as the first application. Further, at some later point in time, the UE 802 may perform one or more uplink user data packet transmissions associated with the first application based on the determined at least one RQoS mapping rule, for example, as described above with respect to FIG. 5. For example, in some cases, the UE 802 may transmit the one or more uplink user data packets via the RQoS mapping rule.

Additionally, after forwarding the plurality of user data packets to the first application, the UE 802 may resume the forwarding of the plurality of downlink user data packets from the lower layer buffer (e.g., DL PDCP buffer 806) to the packet filtering hardware 810, for example, by transmitting at 824 additional control signaling to the DL PDCP buffer 806 indicating to resume forwarding. As noted above, this step may not be necessary if the UE 802 is operating according to an out-of-order delivery mode that does not require the plurality of downlink user data packets to be delivered (e.g., to the first application) in order.

Example RQoS Improvements Related to Handovers

In some cases, a handover of the UE 802 of FIG. 8 from a 4G long term evolution (LTE) base station to a 5G NR base station may cause issues with RQoS. Such issues may arise because RQoS may not be supported in 4G LTE and UE's 5G RQoS capability is not sent from UE to 4G LTE base station, thus, the 4G LTE base station may not know whether the UE 802 supports RQoS, which may lead to packet loss when the UE 802 is handed over to the 5G NR base station.

Figure 9:
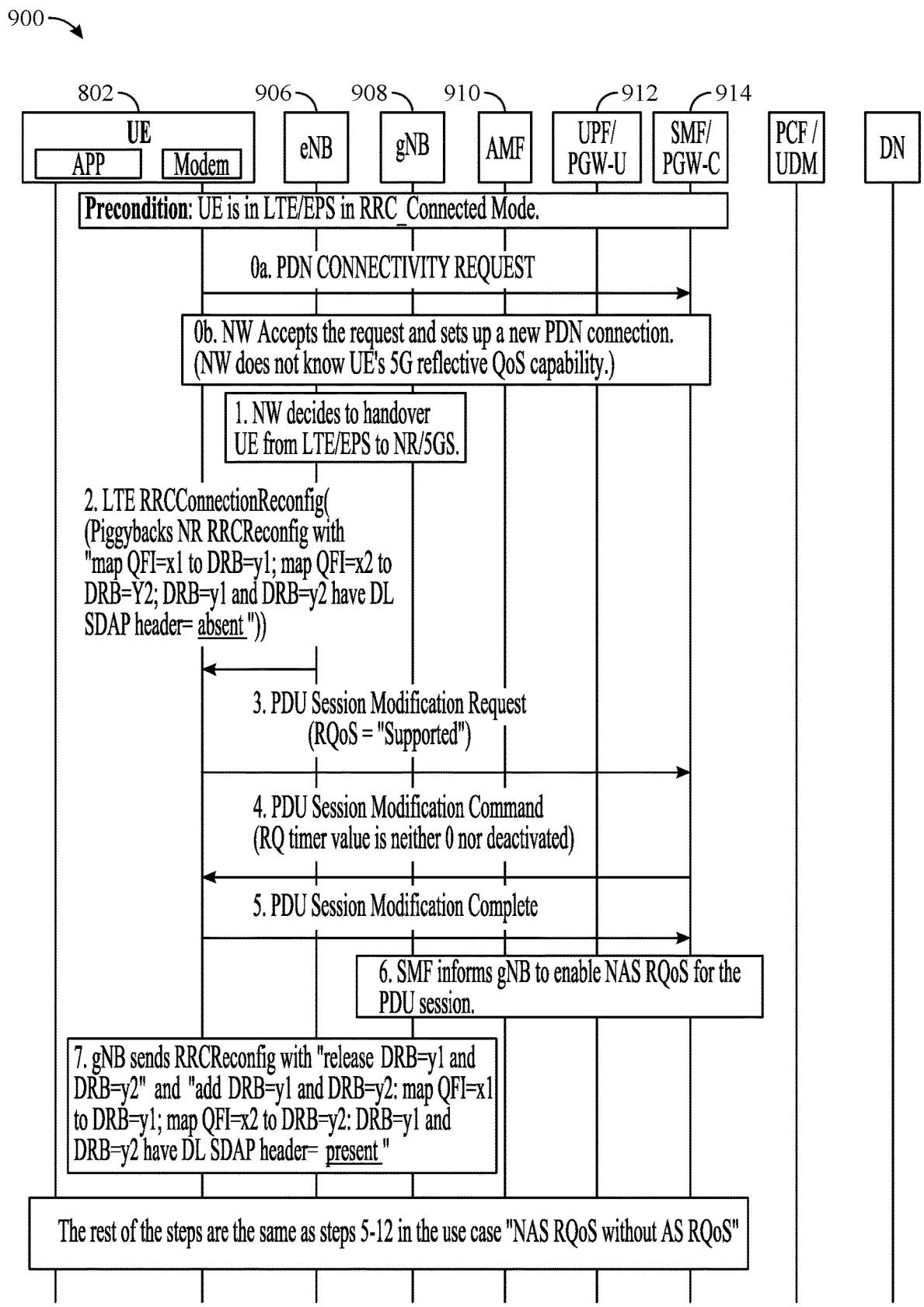
FIG. 9 is a call flow diagram illustrating a handover process related to reflective QoS.

FIG. 9 is a call flow diagram illustrating a handover process 900 showing certain issues with RQoS related to handovers from a 4G LTE base station to a 5G NR base station. The handover process 900 may assume certain preconditions, such as the UE 802 is registered with EPC/LTE in RRC_Connected mode, the UE 802 has "AS RQoS" capability disabled, and the network only supports interworking with N26. In some cases, the handover process 900 may be triggered by the UE 802 receiving an RRC message requesting a handover from EPS to 5GS.

As shown, the handover process 900 occurs between the UE 802 and one or more entities within a network (NW), such as the 4G eNB 906, the 5G gNB 908, the AMF 910, the UPF 912, and the SMF 914.

At step 0A, the UE 802 sends PDN connectivity request message (e.g., without including 5G RQoS capability) to the SMF 912 of the NW for setting up a new PDU session. At step 0B, the NW accepts the request and sets up a new PDN connection. However, the NW does not know the 5G RQoS capability of the UE 802.

At step 1, the NW decides to handover UE 802 from LTE/EPS to NR/5GS (e.g., from the eNB 906 to the gNB 908).

Thereafter, at step 2, the UE 802 receives an LTE RRC-ConnectionReconfig message, which may include NR configuration information, such as map QFI=x1 to DRB=y1; map QFI=x2 to DRB=y2; DRB=y1 and DRB=y2 have DL SDAP header=absent. In current standards, the NW cannot set "DL SDAP header=present" because the NW does not know whether the UE 802 supports NAS RQoS for the new PDU session, so NW has to take the conservative approach and assume the UE 802 does not support RQoS. In addition, the UE 802 does not support the optional AS RQoS (AS feature) as stated in the precondition of this use case. Hence, the RRCReconfiguration for initial DRB setup in 5GS has to configure the UE 802 with DL SDAP header="absent", because DL SDAP header is conditional mandatory for the UE supporting either NAS RQoS or AS RQoS.

At step 3, after completing the handover from EPS to 5GS with N26, the UE 802 sends a PDU Session Modification Request with (RQoS="Supported") to SMF 914.

At step 4, the SMF 914 sends a PDU Session Modification Command with (RQ timer value neither 0 nor deactivated).

At step 5, the UE 802 sends a PDU Session Modification Complete message.

At step 6, the SMF 914 informs the gNB 908 to enable NAS RQoS for the PDU session, based on the UE NAS RQoS capability received in the previous steps.

At step 7, the gNB 908 sends a RRCReconfig message to the UE 802 with "release DRB=y1 and DRB=y2" and "add DRB=y1 and DRB=y2; map QFI=x1 to DRB=y1; map QFI=x2 to DRB=y2; DRB=y1 and DRB=y2 have DL SDAP header=present." After step 7, the UE 802 of FIG. 9 may then be connected with the 5G gNB and may continue to perform the operations illustrated in FIG. 8 for implementing RQoS. However, because the gNB 908 send the release command related to DRB y1 and DRB y2 (e.g., due to the limitation in step 2 regarding DL SDAP header="absent"), data interruption and packet loss may be experienced by the UE 802, which is undesirable.

Accordingly, to help resolve these issues with RQoS related to handover of the UE 802 from the eNB 906 to gNB 908, aspects of the present disclosure provide techniques for providing the NW with 5G RQoS capability information while the UE is connected with the EPS core network. In some cases, the UE 802 may provide the 5G RQoS capability information in at least one of a NAS EPS Mobility Management (EMM) message or an EPS Session Management (ESM) message, for example, via a protocol configuration options (PCO) information element (IE) or extended PCO (ePCO) IE in the PDN connectivity request message.

Figure 10:
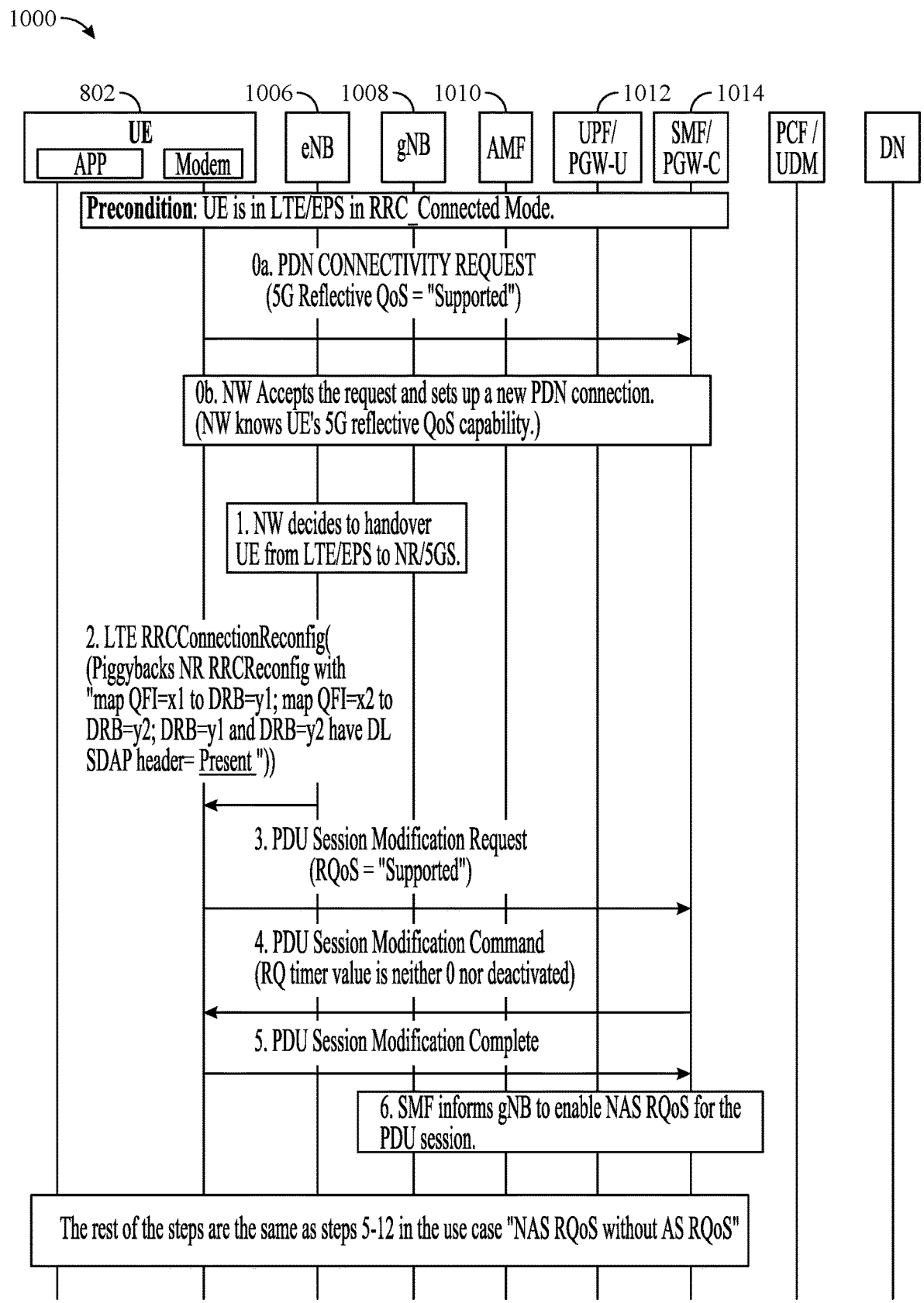
FIG. 10 is a call flow diagram illustrating another handover process related to reflective QoS.

FIG. 10 is a call flow diagram illustrating a handover process 1000 related to RQoS. The operations illustrated in the process 1000 may help to reduce the chances of data interruption and packet loss when a handover is performed and RQoS is implemented.

As shown at step 0A, the UE 802 sends PDN connectivity request message to the SMF 1014 of the NW. Here, unlike in FIG. 9, the UE 802 includes an indication of 5G RQoS capability, for example, by setting 5G reflective QoS capability="supported." At step 0B, the NW Accepts the request and sets up a new PDN connection. Again, unlike in FIG. 9, the NW in FIG. 10 knows 5G RQoS capability of the UE 802.

At step 1, the NW decides to handover UE 802 from LTE/EPS to NR/5GS e.g., from the eNB 906 to the gNB 908).

At step 2, the UE 802 receives an LTE RRCConnectionReconfig message, which may include DRB configuration information for the UE 802 to use with the gNB 1008 after the handover to the gNB 1008. In some cases, the DRB configuration contains an indication that a downlink service data adaptation protocol (SDAP) header is present for at least one DRB associated with the gNB 1008. For specifically, for example, the DRB configuration information may include information, such as map QFI=x1 to DRB=y1; map QFI=x2 to DRB=y2. Additionally, the NR configuration information may indicat that DL SDAP header=Present for DRB=y1 and DRB=y2." In this case, the NW can configure DL SDAP header="present" because NW knows the UE 802 supports the RQoS, based on step 0A above.

At step 3, after completing the handover from EPC to 5GS with N26, the UE 802 sends a PDU Session Modification Request with RQoS="Supported" to the SMF 1014.

At step 4, the SMF 1014 sends a PDU Session Modification Command to the UE 802 with RQ timer value neither 0 nor deactivated.

At step 5, the UE 802 sends a PDU Session Modification Complete.

At step 6, the SMF 1014 informs the gNB 1008 to enable NAS RQoS capability for the PDU session, based on the UE NAS RQoS capability received in the previous steps. Further, as can be seen, unlike FIG. 9, the process 1000 of FIG. 10 does not require step 7 of process 900, which may avoid data interruption and packet loss. Accordingly, after step 6, the UE may then be connected with the 5G gNB and may continue to perform the operations illustrated in FIG. 8 for implementing RQoS.

Methods for Improving RQoS Implementation

Figure 11:
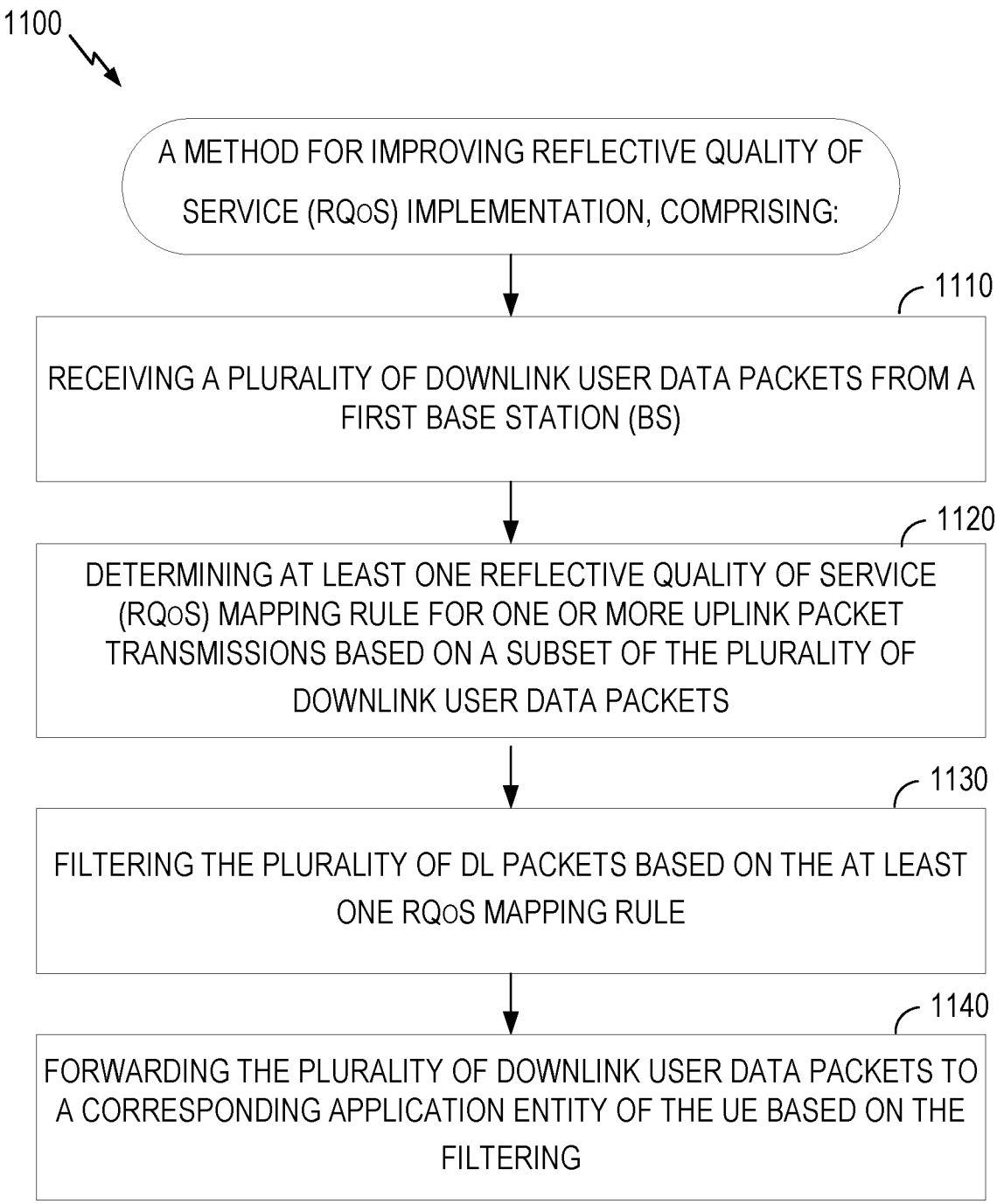
FIG. 11 is a flow diagram illustrating example operations for wireless communication by a UE.

FIG. 11 is a flow diagram illustrating example operations 1100 for wireless communication, in accordance with certain aspects of the present disclosure. The operations 1100 may be performed, for example, by a UE (e.g., such as the UE 104 in the wireless communication network 100 of FIG. 1 and/or the UE 802 of FIG. 8) for improving RQoS implementation as described herein. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the QoS component 281) obtaining and/or outputting signals.

The operations 1100 begin, in block 1110, with receiving a plurality of downlink user data packets from a first base station (BS).

At block 1120, the UE determines at least one reflective quality of service (RQoS) mapping rule for one or more uplink packet transmissions based on a subset of the plurality of downlink user data packets.

At block 1130, the UE filters the plurality of DL packets based on the at least one RQoS mapping rule; and At block 1140, the UE forwards the plurality of downlink user data packets to a corresponding application entity of the UE based on the filtering.

In some cases, the subset of the plurality of downlink user data packets in block 1120 consists of one downlink packet of the plurality of downlink user data packets.

In some cases, receiving the plurality of downlink user data packets in block 1110 may comprise receiving the plurality of downlink user data packets in lower layer buffer of the UE.

In some cases, the operations 1100 may further include forwarding the plurality of downlink user data packets from the lower layer buffer to packet filtering hardware of the UE.

In some cases, the operations 1100 may further include determining, using the packet filtering hardware, whether one or more RQoS mapping rules already exist for the plurality of downlink user data packets.

In some cases, the operations 1100 may further include forwarding the plurality of downlink user data packets from the packet filtering hardware of the UE to a software buffer of the UE when the one or more RQoS mapping rules are determined not to already exist for the plurality of downlink user data packets.

In some cases, forwarding the plurality of downlink user data packets to the corresponding application entity of the UE in block 1140 is performed when the one or more RQoS mapping rules are determined to already exist for the plurality of downlink user data packets.

In some cases, the operations 1100 may further include inspecting one or more parameters included within or associated with at least one downlink packet of the subset of the plurality of downlink user data packets.

In some cases, the at least one RQoS mapping rule determined in block 1120 comprises a first RQoS rule that maps a packet filter to a quality of service (QoS) flow identifier (QFI). In such cases, the operations 1100 may further include determining the packet filter from the one or more parameters within the at least one downlink user data packet. In some cases, the one or more parameters comprise at least one of: a source internet protocol (IP) address of the at least one downlink user data packet, a destination IP address of the at least one downlink user data packet, a source port number of the at least one downlink user data packet, a destination port number of the at least one downlink user data packet, a protocol identifier or a next header type of the at least one downlink user data packet. In some cases, the one or more parameters may include other parameters, such as those described above at least with respect to Table 2.

In some cases, the operations 1100 may further include determining the QFI based on the one or more parameters, wherein the one or more parameters comprise the QFI.

In some cases, the at least one RQoS mapping rule determined in block 1120 comprises a rule mapping a QFI to a data radio bearer (DRB). In such cases, as noted above, the operations 1100 may further include determining the QFI based on the one or more parameters, wherein the one or more parameters comprise the QFI. Additionally, in some cases, the operations 1100 may further include determining the DRB based on a DRB over which the at least one downlink user data packet was received.

In some cases, the operations 1100 may further include forwarding the plurality of downlink user data packets back to the packet filtering hardware of the UE after determining the at least one RQoS mapping rule.

In some cases, the operations 1100 may further include, when the UE is operating according to an in-order delivery mode associated with the plurality of downlink user data packets and when the one or more RQoS mapping rules are determined not to already exist, stopping the forwarding of the plurality of downlink user data packets from lower layer buffer to the packet filtering hardware of the UE.

Additionally, in some cases, the operations 1100 may further include, when the UE is operating according to an out-of-order delivery mode associated with the plurality of downlink user data packets and when the one or more RQoS mapping rules are determined not to already exist, not stopping the forwarding of the plurality of downlink user data packets from lower layer buffer to the packet filtering hardware of the UE.

In some cases, the operations 1100 may further include forwarding the plurality of downlink user data packets back to the packet filtering hardware of the UE after determining the at least one RQoS mapping rule. Additionally, in some cases, the operations 1100 may further include resuming the forwarding of the plurality of downlink user data packets from the lower layer buffer to the packet filtering hardware.

In some cases, the operations 1100 may further include transmitting capability information to the first base station indicating support for RQoS. Additionally, in some cases, the operations 1100 may further include receiving one or more indications to perform RQoS mapping rule determination, wherein determining the at least one RQoS mapping rule based on the indication to perform the RQoS mapping rule determination.

In some cases, the operations 1100 may further include transmitting a PDN connectivity request to a second base station including an indication that the UE supports 5G RQoS. In some cases, the first base station comprises a fifth generation (5G) base station and the second base station comprises a long term evolution (LTE) base station. Further, in some cases, the indication that the UE supports the 5G RQoS is transmitted in at least one of a protocol configuration options (PCO) IE or extended protocol configuration options (ePCO) IE of an uplink session management message.

In some cases, the operations 1100 may further include receiving a handover command from the second base station that includes DRB configuration information for the UE to use with the first base station after a handover to the first base station. In some cases, the DRB configuration contains an indication that a downlink service data adaptation protocol (SDAP) header is present for at least one DRB associated with the first base station.

In some cases, the operations 1100 may further include transmitting the one or more uplink user data packets via the at least one RQoS mapping rule.

Additional Aspects Related to QoS Re-Mapping Based on SDAP End-Marker

In some cases, the 5G NR network (e.g., NG-RAN) may configure the UE to change an AS RQoS mapping of an existing QoS flow from one DRB to another DRB via RRC signaling. In some cases, this may occur when the UE is transmitting one or more uplink user data packets. For example, in some cases, the UE may have already transmitted some of the uplink user data packets to a 5G BS via a first QFI-to-DRB mapping (e.g., mapping a first QFI to a first DRB) when the UE is reconfigured with a second QFI-to-DRB mapping (e.g., mapping the first QFI to a second DRB). In such cases, the BS may receive the one or more uplink user data packets via both the first DRB and the second DRB. To apply this configuration change, the UE may send an SDAP end-marker control PDU on the first DRB, for example, to signify to the base station an end of the one or more uplink user data packets of the first QFI on the first DRB.

Figure 12:
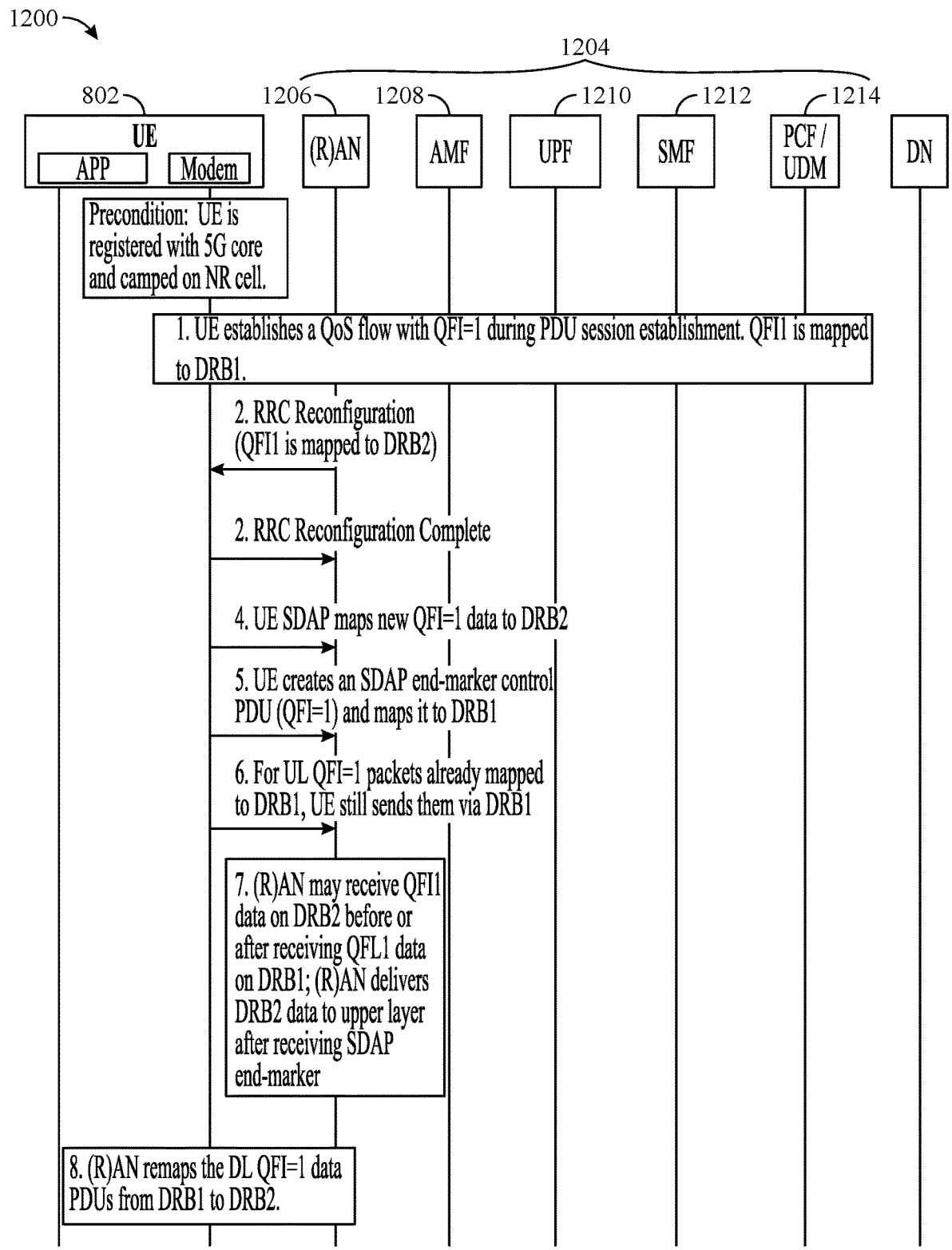
FIG. 12 is a call flow diagram illustrating an example process for using an end-marker packet when QoS re-mapping occurs.

FIG. 12 is a call flow diagram illustrating an example process 1200 for using an end-marker packet when QoS re-mapping occurs. As shown, the process 1200 may involve the UE 802 of FIG. 8 as well as one or more entities/devices in a 5G core (5GC) network 1204. In some cases, the process 1200 may assume certain preconditions, such as the UE 802 registered with the 5GC, is camping on a 5G NR cell in RRC_Connected mode, and the UE 802 has established a PDU session with PDU session type of IPv4, IPv6, IPv4v6, or Ethernet.

As shown in FIG. 12, at step 1, the UE 802 establishes a QoS flow with QFI=1 during PDU session establishment. In some cases, RRC signaling received from the NG-RAN 1206 configures QFI1 to be mapped to DRB1. Thereafter, the UE 802 may transmit one or more uplink user data packets (as well as receive one or more downlink user data packets) associated with an application (APP) of the UE via QFI1 and DRB1. For example, in some cases, the UE 802 may transmit a first uplink user data packet and a second uplink user data packet via QFI1 and DRB1.

At step 2, the NG-RAN 1206 sends an RRC Reconfiguration message to the UE 802, which may include a new QFI-to-DRB mapping rule. In some cases, the new mapping rule may re-map QFI1 to a new DRB, such as DRB2.

At step 3, the UE 802 sends an RRC Reconfiguration Complete message to acknowledge the RRC message received from the NG-RAN 1206.

At step 4, an SDAP layer of the UE 802 may map all new QFI1 uplink user data packets to DRB2. For example, in some cases, the UE 802 may plan to transmit a third uplink user data packet and a fourth uplink user data packet. In such cases, the UE 802 may map the third uplink user data packet and the fourth uplink user data packet to QFI1 and DRB2.

At step 5, after transmitting the first uplink user data packet and the second uplink user data packet and confirming that no new QFI1 uplink user data packets are mapped to DRB1, the UE 802 may generate an SDAP end-marker control PDU (e.g., packet) for QFI1 and send the SDAP end-marker control PDU into a DRB1 transmission buffer. The SDAP end-marker control PDU may be QFI1 last PDCP PDU transmitted by the UE 802 in DRB1. For example, the UE 802 may transmit the SDAP end-marker control PDU after transmission of the second uplink user data packet in DRB1.

In some cases, a PDCP entity (e.g., PDCH buffer) of the UE 802 may preserve an order associated with the SDAP end-marker control PDU and SDAP data PDUs. For example, the PDCP entity may ensure that SDAP control PDU is the last PDCP PDU for QFI1 in DRB1. Therefore, the SDAP control PDU serves as the end-marker in the QFI re-mapping.

At step 6, the UE may have already mapped some QFI1 uplink user data packets to DRB1 and may have sent them to the transmission buffer of DRB1. In such cases, the UE 802 may still transmit all such QFI1 uplink user data packets via DRB1. For example, as noted above, the first uplink user data packet and the second uplink user data packet are already mapped to DRB1 when the UE 802 re-maps QFI1 from DRB1 to DRB2. Accordingly, in such cases, the UE 802 may still transmit the first uplink user data packet and the second uplink user data packet via DRB1. The UE may then transmit the third uplink user data packet and the fourth uplink user data packet via DRB2.

At step 7, due to hybrid automatic repeat request (HARD) and logical channel prioritization (LCP) (e.g., DRB2 may be higher priority than DRB1 in MAC layer scheduling), the NG-RAN 1206 may receive the DRB2 data (e.g., the third uplink user data packet and the fourth uplink user data packet) before receiving the DRB1 data (e.g., the first uplink user data packet and the second uplink user data packet). However, the NG-RAN 1206 may only deliver the DRB2 data to upper layers after receiving the SDAP end-marker control PDU from the UE 802. This means that the NG-RAN 1206 delivers the DRB1 data to the upper layers before delivering DRB2 data for QFI1 in the uplink. For example, in some cases, the third uplink user data packet and the fourth uplink user data packet may be received earlier than the first uplink user data packet, the second uplink user data packet, and/or the SDAP end-marker control PDU. In such cases, the NG-RAN 1206 will deliver the third uplink user data packet and the fourth uplink user data packet to upper layers only after SDAP end-marker control PDU is received.

At step 8, the NG-RAN 1206 re-maps downlink QFI=1 data from DRB1 to DRB2, which may be left up implementation. For example, this step may occur at any time in steps 2-8.

As can be seen in process 1200, when QFI-to-DRB re-mapping occurs, the UE may be required to transmit an end-marker packet. For example, if a QoS flow (QFI=q) is mapped to DRB d1, later on the QFI=q is mapped to another DRB d2, then current standards requires the UE to transmit an SDAP end-marker control PDU in the old DRB (d1), even when "out of order delivery" is configured in the lower layers (e.g., PDCP or RLC) for DRB d1, DRB d2, or both. However, when out-of-order delivery is configured, this SDAP end-marker control PDU may not be necessary since packets may be delivered out of order. Thus, transmitting the SDAP end-marker control PDU may unnecessarily waste power and processing resources at the UE 802 as well as a BS of the NG-RAN 1206 (e.g., BS 102). Additionally, time and frequency resources may be unnecessarily consumed by transmitting the SDAP end-marker control PDU. Moreover, in some cases, the BS may have to wait for the SDAP end-marker control PDU for sending one or more packets to upper layers, which causes unnecessary delay.

Accordingly, aspects presented herein provide techniques for reducing such issues. For example, in some cases, such techniques may include refraining from transmitting the SDAP end-marker control PDU. Additionally, in some cases, the NW (e.g., NG-RAN 1206) may ignore the SDAP end-marker control PDU from UE. Additionally, in some cases, the NW may decide not to wait for the SDAP end-marker control PDU before processing user data in a new DRB that a QoS flow is mapped to.

In some cases, AS RQoS QFI-to-DRB mapping rules may be configured at the UE 802 in two manners, such as by signaling from the NW and by being derived by the UE 802. In some cases, the UE may use the latest QFI-to-DRB mapping rules if the NW-signaled QFI-to-DRB mapping rule (e.g., mapping QFI=1 to DRB=1) and UE-derived QFI-to-DRB mapping rule (e.g., mapping QFI=1 to DRB=2) conflict or overwrite each other.

In some cases, the AS RQoS QFI-to-DRB mapping rules may be derived based on user data, which may arrive at the UE 802 earlier than signaling messages (e.g., since it is stored in the UE 802). However, this user data may get delayed in lower layers of the UE 802 due to re-ordering at PDCP/L2 lower layers. Accordingly, there may be instances in which the UE-derived QFI-to-DRB mapping rules (e.g., based on earlier user data) conflict with NW-signaled QFI-to-DRB mapping rules (e.g., which are later than the user data). Thus, it may be unclear how to resolve conflicts between the UE-derived QFI-to-DRB mapping rules and NW-signaled QFI-to-DRB mapping rules in such cases and determine the latest QFI-to-DRB mapping rule in time (e.g., most-recent).

Accordingly, to resolve these issues and to the determine QFI-to-DRB mapping rule, the UE 802 may record a timestamp (or the radio frame number, frame number and/or subframe number) associated with the user data used for deriving the UE-derived QFI-to-DRB mapping rule as well as a timestamp associated with the control message (e.g., RRCReconfiguration message) containing the NW-signaled QFI-to-DRB mapping rule. Accordingly, based on the timestamps, the UE may determine a relative timing between the UE-derived QFI-to-DRB mapping rule and the NW-signaled QFI-to-DRB mapping rule. Based on the relative timing, the UE 802 may use the latest QFI-to-DRB mapping rule, for example, for receiving and transmitting user data packets as described herein.

Methods for QoS Re-Mapping

Figure 13:
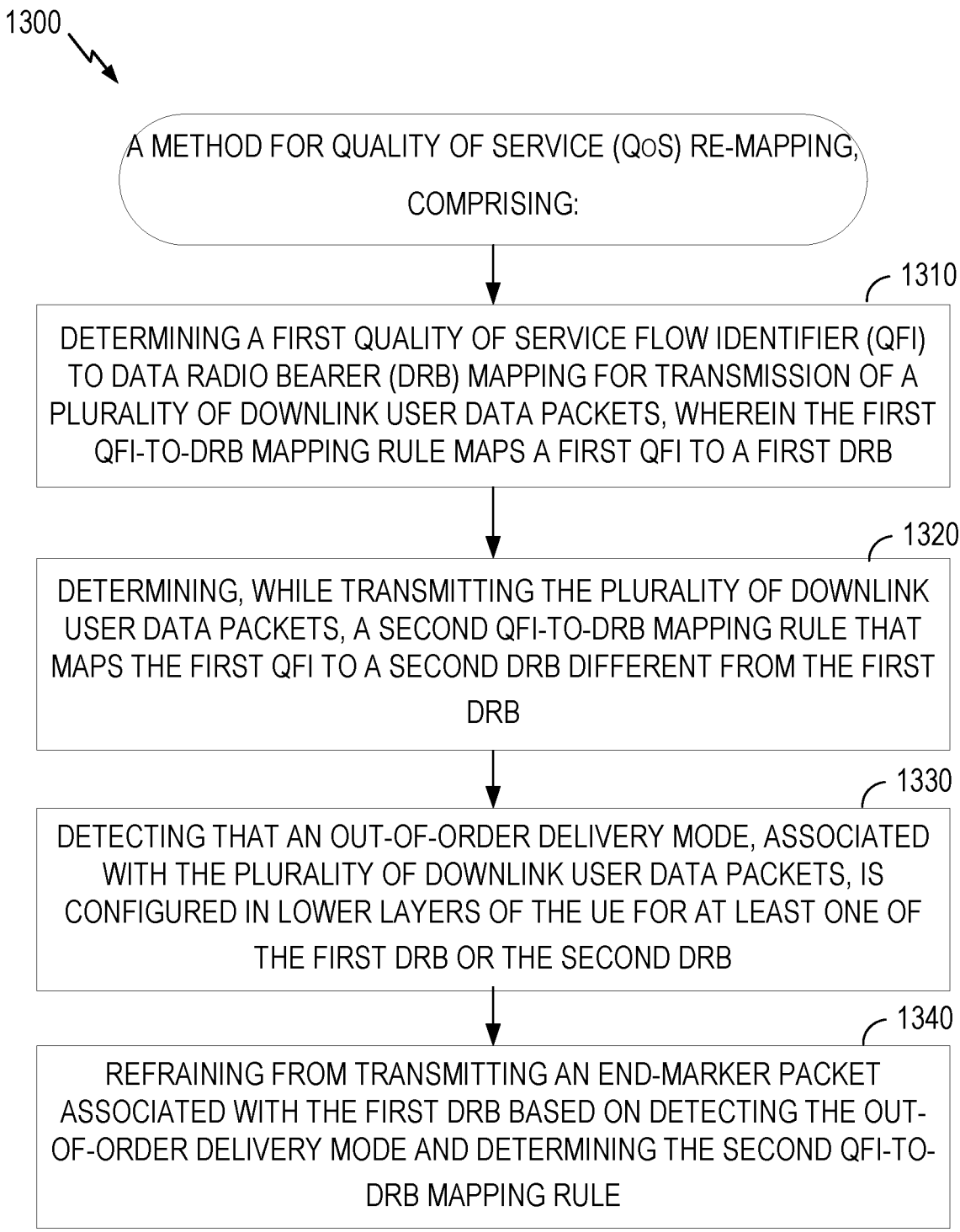
FIG. 13 is a flow diagram illustrating example operations for wireless communication by a UE.

FIG. 13 is a flow diagram illustrating example operations 1300 for wireless communication, in accordance with certain aspects of the present disclosure. The operations 1300 may be performed, for example, by a UE (e.g., such as the UE 104 in the wireless communication network 100 of FIG. 1 and/or the UE 802 of FIG. 8) for QoS re-mapping as described herein. The operations 1300 may be implemented as software components that are executed and run on one or more processors (e.g., controller/processor 280 of FIG. 2). Further, the transmission and reception of signals by the UE in operations 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the QoS component 281) obtaining and/or outputting signals.

The operations 1300 begin, in block 1310, with determining a first quality of service flow identifier (QFI) to data radio bearer (DRB) mapping for transmission of a plurality of downlink user data packets, wherein the first QFI-to-DRB mapping rule maps a first QFI to a first DRB.

In block 1320, the UE determines, while transmitting the plurality of downlink user data packets, a second QFI-to-DRB mapping rule that maps the first QFI to a second DRB different from the first DRB.

In block 1320, the UE detects that an out-of-order delivery mode, associated with the plurality of downlink user data packets, is configured in lower layers of the UE for at least one of the first DRB or the second DRB.

In block 1340, the UE refrains from transmitting an end-marker packet associated with the first DRB based on detecting the out-of-order delivery mode and determining the second QFI-to-DRB mapping rule.

In some cases, the lower layers of the UE comprise at least one of a packet data convergence protocol (PDCP) layer of the UE or a radio link control (RLC) layer of the UE.

In some cases, the end-marker packet indicates an end of transmission user data packets of a QoS flow on a corresponding DRB.

In some cases, the end-marker packet comprises an end-marker service data adaptation protocol (SDAP) control protocol data unit (PDU).

In some cases, the operations 1300 may further include receiving an indication of the first QFI-to-DRB mapping rule from a base station of a wireless network. In some cases, the base station may include a 5G base station. In such cases, determining the first QFI-to-DRB mapping rule in block 1310 may be based on the indication of the first QFI-to-DRB mapping rule received from the base station.

In some cases, determining the second QFI-to-DRB mapping rule in block 1310 may comprise deriving the second QFI-to-DRB mapping rule. In some cases, the UE may derive the second QFI-to-DRB mapping rule using techniques described above.

In some cases, the operations 1300 may further include recording first timing information associated with the indication of the first QFI-to-DRB mapping rule received from the base station. In some cases, the operations 1300 may further include recording second timing information associated with the second QFI-to-DRB mapping rule derived by the UE. In some cases, the first timing information and the second timing information may comprise at least one of a timestamp, a radio frame number, a frame number, or a subframe number.

In some cases, the operations 1300 may further include determining that the first QFI-to-DRB mapping rule and the second QFI-to-DRB mapping rule conflict.

In some cases, the operations 1300 may further include, in response to the determined conflict, determining which of the first QFI-to-DRB mapping rule or the second QFI-to-DRB mapping rule is latest in time based on the first timing information and the second timing information.

In some cases, the operations 1300 may further include determining, based on the first timing information and the second timing information, that the second QFI-to-DRB mapping rule is latest in time.

In some cases, the operations 1300 may further include using the second QFI-to-DRB mapping rule to transmit one or more uplink user data packets.

In some cases, the operations 1300 may further include determining, based on the first timing information and the second timing information, that the first QFI-to-DRB mapping rule is latest in time.

In some cases, the operations 1300 may further include using the first QFI-to-DRB mapping rule to transmit one or more uplink user data packets.

Additional Aspects Related to Indicating NAS RQoS Capability

In some cases, current standards may allow a UE to set its capability of NAS RQoS support per PDU session. However, certain PDU sessions, such as IMS PDU sessions and emergency PDU sessions, may not be suitable for NAS RQoS. For example, for IMS and emergency services, the network may already know the packet filters for these services. Additionally, currently many operators require the UE to perform a pre-condition check in which the required/expected packet filters should be configured in the UE to transmit IMS signaling successfully.

Additionally, NAS RQoS may not be applicable to GBR QoS flows. In some cases, IMS PDU sessions contain both non-GBR (e.g., session initiation protocol (SIP) signaling) and GBR QoS flows (e.g., voice/video flow). In theory, NAS RQoS may be applicable to SIP signaling flow. However, the first message in SIP signaling flow is uplink, hence NW must create a QoS rule for SIP signaling flow via NAS signaling instead of using only NAS RQoS. This is because NAS RQoS relies on the DL data packet for the UE to create QoS mapping rule.

Further, real-time services may need short packet end-to-end latency. However, NAS RQoS increases downlink packet latency due to QoS rule derivation processing.

Accordingly, as can be seen, there may be certain PDU sessions where RQoS may not be suitable and may cause issues. Therefore, aspects of the present disclosure provide techniques for helping to reduce such issues. For example, in some cases, such techniques may include a UE transmitting an indication to a base station that indicates that the UE does not support RQoS for certain PDU sessions (e.g., even though the UE does support RQoS). For example, when determining to establish a new PDU session with the base station (or when the UE receives a handover command to hand an existing PDU session over to the base station from a second base station), the UE may indicate a NAS RQoS capability as "not supporting NAS RQoS" to the base station for PDU sessions associated with IMS, emergency, low-latency, or real-time service types. In other cases, the UE may indicate the NAS RQoS capability as "supporting NAS RQoS" for PDU sessions associated with other service types (e.g., internet PDU sessions). In some cases, the UE may provide this indication in at least one of a NAS PDU session establishment request message or a PDU session modification request message.

Methods for Indicating NAS RQoS Capability

Figure 14:
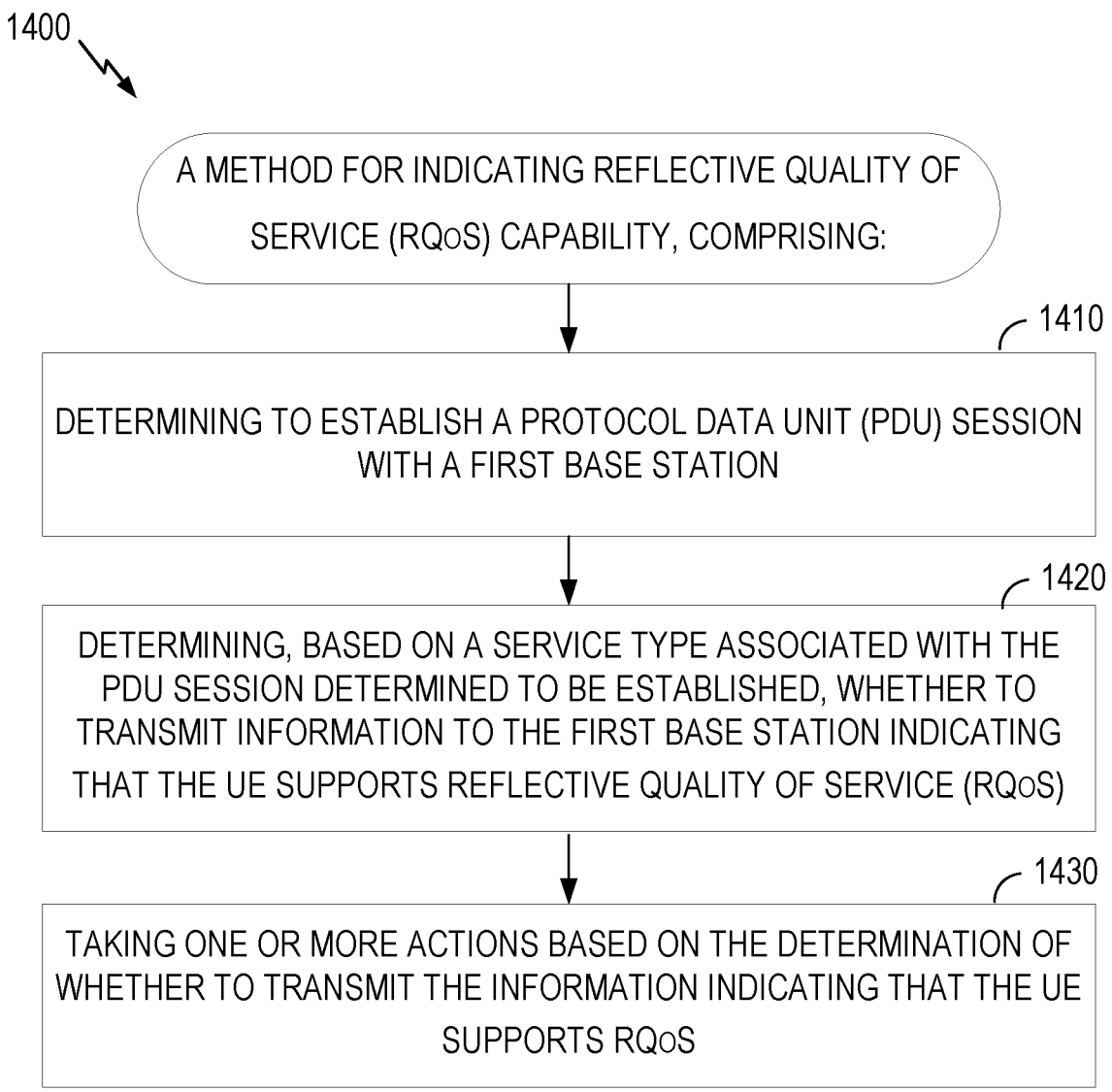
FIG. 14 is a flow diagram illustrating example operations for wireless communication by a UE.

FIG. 14 is a flow diagram illustrating example operations 1400 for wireless communication, in accordance with certain aspects of the present disclosure. The operations 1400 may be performed, for example, by a UE (e.g., such as the UE 104 in the wireless communication network 100 of FIG. 1 and/or the UE 802 of FIG. 8) for indicating RQoS capability. The operations 1400 may be implemented as software components that are executed and run on one or more processors (e.g., controller/processor 280 of FIG. 2).

Further, the transmission and reception of signals by the UE in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the QoS component 281) obtaining and/or outputting signals.

The operations 1400 begin, in block 1410, determining to establish a protocol data unit (PDU) session with a first base station.

In block 1420, the UE determines, based on a service type associated with the PDU session determined to be established, whether to transmit information to the first base station indicating that the UE supports reflective quality of service (RQoS).

In block 1430, the UE takes one or more actions based on the determination of whether to transmit the information indicating that the UE supports RQoS.

In some cases, taking the one or more actions in block 1430 comprises transmitting information indicating that the UE does not support the RQoS mapping when the service type associated with the PDU session is a first service type and transmitting the information indicating that the UE supports the RQoS mapping when the service type associated with the PDU session is a second service type. In some cases, transmitting the information indicating that the UE supports the RQoS mapping in block comprises transmitting the information indicating that the UE supports the RQoS mapping in at least one of a non-access stratum (NAS) PDU session establishment request or a PDU session modification request for the PDU session.

In some cases, the first service type comprises one of an internet protocol multimedia subsystem (IMS) PDU session, an emergency PDU session, a low-latency-based PDU session, or a real-time-based PDU session.

In some cases, the second service type comprises any service type other than an internet protocol multimedia subsystem (IMS) PDU session, an emergency PDU session, a low-latency-based PDU session, or a real-time-based PDU session In some cases, determining to establish the PDU session with the first base station in block 1410 comprises receiving a handover command to hand over the PDU session from a second base station to the first base station.

Example Wireless Communication Devices

Figure 15:
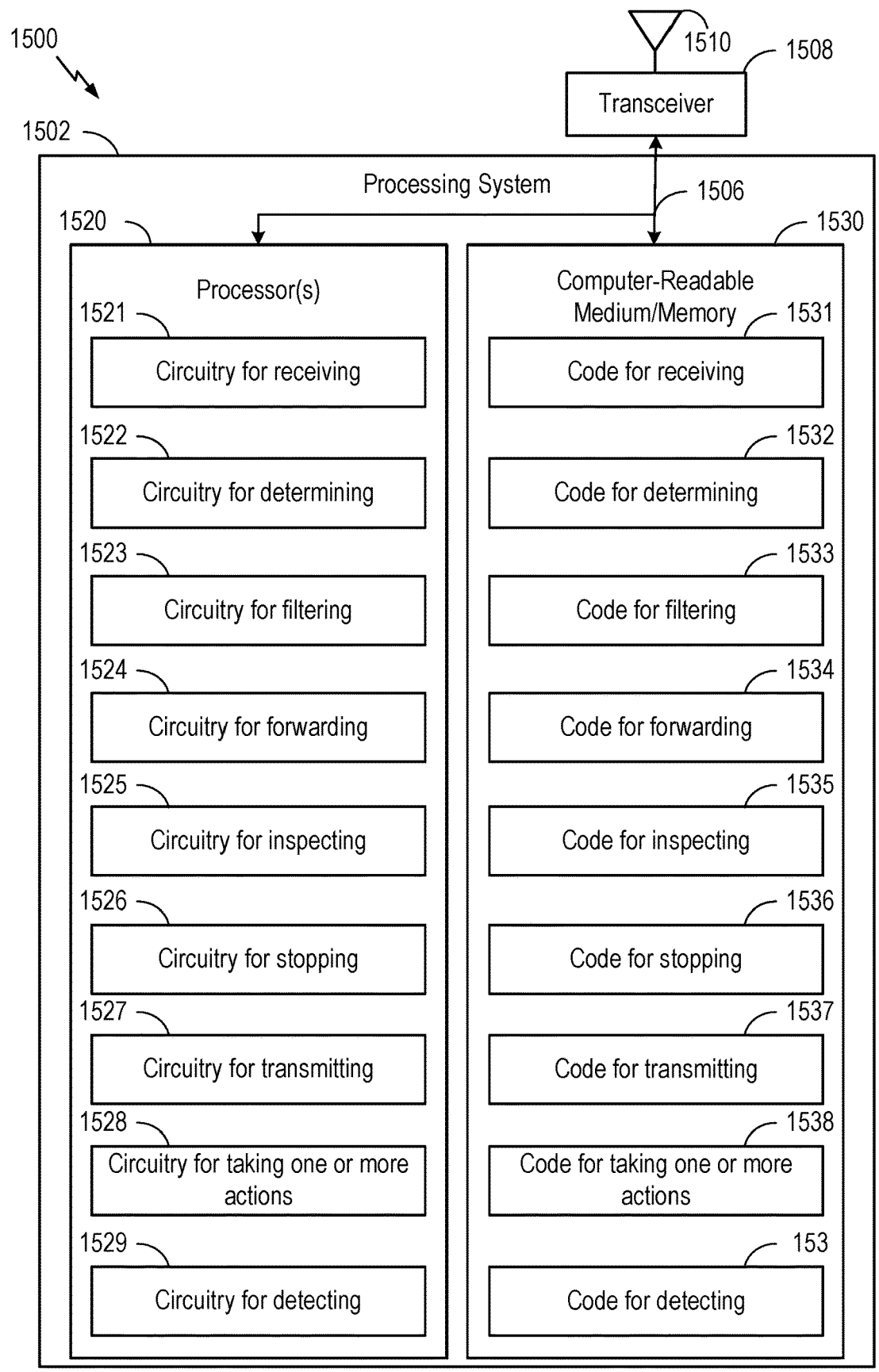
FIG. 15 depicts aspects of an example communications device.

FIG. 15 depicts an example communications device 1500 that includes various components operable, configured, or adapted to perform operations for the techniques disclosed herein, such as the operations depicted and described with respect to FIGS. 6-14. In some examples, communication device 1500 may be a base station 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1520 via a bus 1506. In certain aspects, computer-readable medium/memory 1520 is configured to store instructions (e.g., computer-executable code) that when executed by the one or more processors 1520, cause the one or more processors 1520 to perform the operations illustrated in FIGS. 6-14, or other operations for performing the various techniques discussed herein for improving RQoS implementation.

In the depicted example, computer-readable medium/memory 1530 stores code 1531 for receiving, code 1532 for determining, code 1533 for filtering, code 1534 for forwarding, code 1535 for inspecting, code 1536 for stopping, code 1537 for transmitting, code 1538 for taking one or more actions, and code 1539 for detecting.

In the depicted example, the one or more processors 1520 include circuitry configured to implement the code stored in the computer-readable medium/memory 1520, including circuitry 1521 for receiving, code 1522 for determining, code 1523 for filtering, code 1524 for forwarding, code 1525 for inspecting, code 1526 for stopping, code 1527 for transmitting, code 1528 for taking one or more actions, and code 1529 for detecting Various components of communications device 1500 may provide means for performing the methods described herein, including with respect to FIGS. 4-16.

In some examples, means for transmitting or sending (or means for outputting for transmission) may include the transceivers 232 and/or antenna(s) 234 of the base station 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the base station illustrated in FIG. 2 and/or transceiver 1508 and antenna 1510 of the communication device 1500 in FIG. 15.

In some examples, means for determining, means for filtering, means for forwarding, means for inspecting, means for stopping, means for taking one or more actions, and means for detecting may include various processing system components, such as: the one or more processors 1520 in FIG. 15, or aspects of the base station 102 depicted in FIG. 2, including receive processor 238, transmit processor 220, TX MIMO processor 230, and/or controller/processor 240 (including QoS component 241).

Notably, FIG. 15 is just use example, and many other examples and configurations of communication device 1500 are possible.

Example Clauses

Implementation examples are described in the following numbered clauses:

Clause 1: A method for wireless communication by a user equipment (UE), comprising: receiving a plurality of downlink user data packets from a first base station (BS); determining at least one reflective quality of service (RQoS) mapping rule for one or more uplink packet transmissions based on a subset of the plurality of downlink user data packets; filtering the plurality of downlink user data packets based on the at least one RQoS mapping rule; and forwarding the plurality of downlink user data packets to a corresponding application entity of the UE based on the filtering.

Clause 2: The method of Clause 1, wherein: receiving the plurality of downlink user data packets comprises receiving the plurality of downlink user data packets in lower layer buffer of the UE; and the method further comprises forwarding the plurality of downlink user data packets from the lower layer buffer to packet filtering hardware of the UE.

Clause 3: The method of Clause 2, further comprising: determining, using the packet filtering hardware, whether one or more RQoS mapping rules already exist for the plurality of downlink user data packets; and forwarding the plurality of downlink user data packets from the packet filtering hardware of the UE to a software buffer of the UE when the one or more RQoS mapping rules are determined not to already exist for the plurality of downlink user data packets, wherein forwarding the plurality of downlink user data packets to the corresponding application entity of the UE is performed when the one or more RQoS mapping rules are determined to already exist for the plurality of downlink user data packets.

Clause 4: The method of Clause 3, further comprising inspecting one or more parameters included within or associated with at least one downlink packet of the subset of the plurality of downlink user data packets.

Clause 5: The method of Clause 4, wherein the at least one RQoS mapping rule comprises a first RQoS rule that maps a packet filter to a quality of service (QoS) flow identifier (QFI).

Clause 6: The method of Clause 5, further comprising determining the packet filter from the one or more parameters within the at least one downlink user data packet, wherein the one or more parameters comprise at least one of: a source internet protocol (IP) address of the at least one downlink user data packet; a destination IP address of the at least one downlink user data packet; a source port number of the at least one downlink user data packet; a destination port number of the at least one downlink user data packet; or a protocol identifier or a next header type of the at least one downlink user data packet.

Clause 7: The method of any one of Clauses 5-6, further comprising determining the QFI based on the one or more parameters, wherein the one or more parameters comprise the QFI.

Clause 8: The method of Clause 4, wherein the at least one RQoS mapping rule comprises a rule mapping a quality of service (QoS) flow identifier (QFI) to a data radio bearer (DRB).

Clause 9: The method of Clause 8, further comprising determining the QFI based on the one or more parameters, wherein the one or more parameters comprise the QFI.

Clause 10: The method of any one of Clauses 8-9, further comprising determining the DRB based on a DRB over which the at least one downlink user data packet was received.

Clause 11: The method of any one of Clauses 3-10, further comprising forwarding the plurality of downlink user data packets back to the packet filtering hardware of the UE after determining the at least one RQoS mapping rule.

Clause 12: The method any one of Clauses 3-11, further comprising: when the UE is operating according to an in-order delivery mode associated with the plurality of downlink user data packets and when the one or more RQoS mapping rules are determined not to already exist, stopping the forwarding of the plurality of downlink user data packets to the packet filtering hardware of the UE; and when the UE is operating according to an out-of-order delivery mode associated with the plurality of downlink user data packets and when the one or more RQoS mapping rules are determined not to already exist, not stopping the forwarding of the plurality of downlink user data packets to the packet filtering hardware of the UE.

Clause 13: The method of Clause 12, further comprising: forwarding the plurality of downlink user data packets back to the packet filtering hardware of the UE after determining the at least one RQoS mapping rule; and resuming the forwarding of the plurality of downlink user data packets from the lower layer buffer to the packet filtering hardware.

Clause 14: The method of any one of Clauses 1-13, further comprising: transmitting capability information to the first base station indicating support for RQoS; and receiving one or more indications to perform RQoS mapping rule determination, wherein determining the at least one RQoS mapping rule based on the indication to perform the RQoS mapping rule determination.

Clause 15: The method of any one of Clauses 1-14, wherein the subset of the plurality of downlink user data packets consists of one downlink packet of the plurality of downlink user data packets.

Clause 16: The method of any one of Clauses 1-15, further comprising transmitting a PDN connectivity request to a second base station including an indication that the UE supports 5G RQoS, wherein the first base station comprises a fifth generation (5G) base station and the second base station comprises a long term evolution (LTE) base station.

Clause 17: The method of Clause 16, wherein the indication that the UE supports the 5G RQoS is transmitted in at least one of a protocol configuration options (PCO) information element (IE) or extended protocol configuration options (ePCO) IE of an uplink session management message.

Clause 18: The method of any one of Clauses 16-17, further comprising receiving a handover command from the second base station that includes: DRB configuration information for the UE to use with the first base station after a handover to the first base station, wherein the DRB configuration information includes an indication that a downlink service data application protocol (SDAP) header is present for at least one DRB associated with the first base station.

Clause 19: A method for wireless communication by a user equipment (UE), comprising: determining to establish a protocol data unit (PDU) session with a first base station; determining, based on a service type associated with the PDU session to be established, whether to transmit information to the first base station indicating that the UE supports reflective quality of service (RQoS); and taking one or more actions based on the determination of whether to transmit the information indicating that the UE supports RQoS.

Clause 20: The method of Clause 19, wherein taking the one or more actions comprises: transmitting information indicating that the UE does not support RQoS when the service type associated with the PDU session is a first service type; and transmitting the information indicating that the UE supports RQoS when the service type associated with the PDU session is a second service type.

Clause 21: The method of Clause 20, wherein the first service type comprises one of: an internet protocol multimedia subsystem (IMS) PDU session; an emergency PDU session; a low-latency-based PDU session; or a real-time-based PDU session.

Clause 22: The method of any one of Clauses 20-21, wherein the second service type comprises any PDU session other than: an internet protocol multimedia subsystem (IMS) PDU session; an emergency PDU session; a low-latency-based PDU session; or a real-time-based PDU session.

Clause 23: The method of any one of Clauses 20-22, wherein transmitting the information indicating that the UE supports the RQoS comprises transmitting the information indicating that the UE supports RQoS in at least one of a non-access stratum (NAS) PDU session establishment request or a PDU session modification request for the PDU session.

Clause 24: The method of any one of Clauses 19-23, wherein determining to establish the PDU session with the first base station comprises receiving a handover command to hand over the PDU session from a second base station to the first base station.

Clause 25: A method for wireless communication by a user equipment (UE), comprising: determining a first quality of service flow identifier (QFI) to data radio bearer (DRB) mapping rule for transmission of a plurality of downlink user data packets, wherein the first QFI-to-DRB mapping rule maps a first QFI to a first DRB; determining, while transmitting the plurality of downlink user data packets, a second QFI-to-DRB rule mapping that maps the first QFI to a second DRB different from the first DRB; detecting that an out-of-order delivery mode, associated with the plurality of downlink user data packets, is configured in lower layers of the UE for at least one of the first DRB or the second DRB; and refraining from transmitting an end-marker packet associated with the first DRB based on detecting the out-of-order delivery mode and determining the second QFI-to-DRB mapping rule.

Clause 25: The method of Clause 25, wherein the lower layers of the UE comprise at least one of a packet data convergence protocol (PDCP) layer of the UE or a radio link control (RLC) layer of the UE.

Clause 26: The method of any one of Clauses 25-26, wherein the end-marker packet indicates an end of transmission user data packets of a QoS flow on a corresponding DRB.

Clause 27: The method of any one of Clauses 25-26, wherein the end-marker packet comprises an end-marker service data application protocol (SDAP) control protocol data unit (PDU).

Clause 28: The method of any one of Clauses 25-27, further comprising receiving an indication of the first QFI-to-DRB mapping rule from a base station of a wireless network.

Clause 29: The method of Clause 28, wherein determining the first QFI-to-DRB mapping rule is based on the indication of the first QFI-to-DRB mapping rule received from the base station.

Clause 30: The method of any one of Clauses 28-39, wherein determining the second QFI-to-DRB mapping rule comprises deriving the second QFI-to-DRB mapping rule.

Clause 31: The method of Clause 30, further comprising recording first timing information associated with the indication of the first QFI-to-DRB mapping rule received from the base station.

Clause 32: The method of Clause 31, further comprising recording second timing information associated with the second QFI-to-DRB mapping rule derived by the UE.

Clause 33: The method of Clause 32, wherein the first timing information and the second timing information comprise at least one of a timestamp a radio frame number, a frame number, or a subframe number.

Clause 34: The method of Clause 32, further comprising determining that the first QFI-to-DRB mapping rule and the second QFI-to-DRB mapping rule conflict.

Clause 35: The method of Clause 34, further comprising, in response to the determined conflict, determining which of the first QFI-to-DRB mapping rule or the second QFI-to-DRB mapping rule is latest in time based on the first timing information and the second timing information.

Clause 36: The method of Clause 35, further comprising determining, based on the first timing information and the second timing information, that the second QFI-to-DRB mapping rule is latest in time.

Clause 37: The method of Clause 36, further comprising using the second QFI-to-DRB mapping rule to transmit one or more uplink user data packets.

Clause 38: The method of Clause 35, further comprising determining, based on the first timing information and the second timing information, that the first QFI-to-DRB mapping rule is latest in time.

Clause 39: The method of Clause 38, using the first QFI-to-DRB mapping rule to transmit one or more uplink user data packets.

Clause 40: An apparatus, comprising: a memory comprising executable instructions; one or more processors configured to execute the executable instructions and cause the apparatus to perform a method in accordance with any one of Clauses 1-37.

Clause 41: An apparatus, comprising means for performing a method in accordance with any one of Clauses 1-37.

Clause 42: A non-transitory computer-readable medium comprising executable instructions that, when executed by one or more processors of an apparatus, cause the apparatus to perform a method in accordance with any one of Clauses 1-37.

Clause 43: A computer program product embodied on a computer-readable storage medium comprising code for performing a method in accordance with any one of Clauses 1-37.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of improving RQoS implementation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving, in a lower layer buffer of the UE, a plurality of downlink user data packets from a first base station (BS);
   forwarding the plurality of downlink user data packets from the lower layer buffer to packet filtering hardware of the UE;
   determining, using the packet filtering hardware, whether one or more reflective quality of service (RQoS) mapping rules already exist for the plurality of downlink user data packets;
   forwarding the plurality of downlink user data packets from the packet filtering hardware of the UE to a software buffer of the UE when it is determined that the one or more RQoS mapping rules do not already exist for the plurality of downlink user data packets;
   determining at least one RQoS mapping rule for one or more uplink packet transmissions based on a subset of the plurality of downlink user data packets;
   filtering, at packet filtering hardware, the plurality of downlink user data packets based on the at least one RQoS mapping rule; and
   forwarding, when it is determined that the one or more RQoS mapping rules already exist for the plurality of downlink user data packets, the plurality of downlink user data packets to a corresponding application entity of the UE based on the filtering.

2. The method of claim 1, further comprising inspecting one or more parameters included within or associated with at least one downlink packet of the subset of the plurality of downlink user data packets.

3. The method of claim 2, wherein the at least one RQoS mapping rule comprises a first RQoS rule that maps a packet filter to a quality of service (QoS) flow identifier (QFI).

4. The method of claim 3, further comprising determining the packet filter from the one or more parameters within the at least one downlink packet, wherein the one or more parameters comprise at least one of:
   a source internet protocol (IP) address of the at least one downlink packet;
   a destination IP address of the at least one downlink packet;
   a source port number of the at least one downlink packet;
   a destination port number of the at least one downlink packet; or
   a protocol identifier or a next header type of the at least one downlink packet.

5. The method of claim 3, further comprising determining the QFI based on the one or more parameters, wherein the one or more parameters comprise the QFI.

6. The method of claim 2, wherein the at least one RQoS mapping rule comprises a rule mapping a quality of service (QoS) flow identifier (QFI) to a data radio bearer (DRB).

7. The method of claim 6, further comprising determining the QFI based on the one or more parameters, wherein the one or more parameters comprise the QFI.

8. The method of claim 6, further comprising determining the DRB based on a DRB over which the at least one downlink packet was received.

9. The method of claim 1, further comprising forwarding the plurality of downlink user data packets back to the packet filtering hardware of the UE after determining the at least one RQoS mapping rule.

10. The method claim 1, further comprising:
    when the UE is operating according to an in-order delivery mode associated with the plurality of downlink user data packets and when the one or more RQoS mapping rules are determined not to already exist, stopping the forwarding of the plurality of downlink user data packets to the packet filtering hardware of the UE; and
    when the UE is operating according to an out-of-order delivery mode associated with the plurality of downlink user data packets and when the one or more RQoS mapping rules are determined not to already exist, not stopping the forwarding of the plurality of downlink user data packets to the packet filtering hardware of the UE.

11. The method of claim 10, further comprising:
    forwarding the plurality of downlink user data packets back to the packet filtering hardware of the UE after determining the at least one RQoS mapping rule; and
    resuming the forwarding of the plurality of downlink user data packets from the lower layer buffer to the packet filtering hardware.

12. The method of claim 1, further comprising:
    transmitting capability information to the first base station indicating support for RQoS; and
    receiving one or more indications to perform RQoS mapping rule determination, wherein determining the at least one RQoS mapping rule is based on the indication to perform the RQoS mapping rule determination.

13. The method of claim 1, wherein the subset of the plurality of downlink user data packets consists of one downlink packet of the plurality of downlink user data packets.

14. The method of claim 1, further comprising transmitting a PDN connectivity request to a second base station including an indication that the UE supports 5G RQoS, wherein the first base station comprises a fifth generation (5G) base station and the second base station comprises a long term evolution (LTE) base station.

15. The method of claim 14, wherein the indication that the UE supports the 5G RQoS is transmitted in at least one of a protocol configuration options (PCO) information element (IE) or extended protocol configuration options (ePCO) IE of an uplink session management message.

16. The method of claim 14, further comprising receiving a handover command from the second base station that includes:
    DRB configuration information for the UE to use with the first base station after a handover to the first base station, wherein the DRB configuration information includes an indication that a downlink service data application protocol (SDAP) header is present for at least one DRB associated with the first base station.

17. An apparatus for wireless communication by a user equipment (UE), comprising:
a memory comprising executable instructions; and
one or more processors configured to execute the executable instructions and cause the apparatus to:
receive, in a lower layer buffer of the UE, a plurality of downlink user data packets from a first base station (BS);
forward the plurality of downlink user data packets from the lower layer buffer to packet filtering hardware of the UE;
determine, using the packet filtering hardware, whether one or more reflective quality of service (RQoS) mapping rules already exist for the plurality of downlink user data packets;
forward the plurality of downlink user data packets from the packet filtering hardware of the UE to a software buffer of the UE when it is determined that the one or more RQoS mapping rules do not already exist for the plurality of downlink user data packets;
determine at least one RQoS mapping rule for one or more uplink packet transmissions based on a subset of the plurality of downlink user data packets;
filter, at packet filtering hardware, the plurality of downlink user data packets based on the at least one RQoS mapping rule; and
forward, when it is determined that the one or more RQoS mapping rules already exist for the plurality of downlink user data packets, the plurality of downlink user data packets to a corresponding application entity of the UE based on the filtering.

18. The apparatus of claim 17, wherein the one or more processors are further configured to cause the apparatus to inspect one or more parameters included within or associated with at least one downlink packet of the subset of the plurality of downlink user data packets.

19. The apparatus of claim 18, wherein the at least one RQoS mapping rule comprises a first RQoS rule that maps a packet filter to a quality of service (QoS) flow identifier (QFI).

20. The apparatus of claim 19, wherein the one or more processors are further configured to cause the apparatus to determine the packet filter from the one or more parameters within the at least one downlink packet, wherein the one or more parameters comprise at least one of:

a source internet protocol (IP) address of the at least one downlink packet;
a destination IP address of the at least one downlink packet;
a source port number of the at least one downlink packet;
a destination port number of the at least one downlink packet; or
a protocol identifier or a next header type of the at least one downlink packet.

21. The apparatus of claim 19, wherein the one or more processors are further configured to cause the apparatus to determine the QFI based on the one or more parameters, wherein the one or more parameters comprise the QFI.

22. The apparatus of claim 18, wherein the at least one RQoS mapping rule comprises a rule mapping a quality of service (QoS) flow identifier (QFI) to a data radio bearer (DRB).

23. The apparatus of claim 22, wherein the one or more processors are further configured to cause the apparatus to determine the QFI based on the one or more parameters, wherein the one or more parameters comprise the QFI.

24. The apparatus of claim 22, wherein the one or more processors are further configured to cause the apparatus to determine the DRB based on a DRB over which the at least one downlink packet was received.

25. The apparatus of claim 17, wherein the one or more processors are further configured to cause the apparatus to forward the plurality of downlink user data packets back to the packet filtering hardware of the UE after determining the at least one RQoS mapping rule.

26. The apparatus of claim 17, wherein the one or more processors are further configured to cause the apparatus to:
when the UE is operating according to an in-order delivery mode associated with the plurality of downlink user data packets and when the one or more RQoS mapping rules are determined not to already exist, stop the forwarding of the plurality of downlink user data packets to the packet filtering hardware of the UE; and
when the UE is operating according to an out-of-order delivery mode associated with the plurality of downlink user data packets and when the one or more RQoS mapping rules are determined not to already exist, not stop the forwarding of the plurality of downlink user data packets to the packet filtering hardware of the UE.

* * * * *